(12) United States Patent
Piecuch

(10) Patent No.: US 9,832,072 B1
(45) Date of Patent: Nov. 28, 2017

(54) SELF-CONFIGURING COMPUTER NETWORK ROUTER

(71) Applicant: 128 Technology, Inc., Burlington, MA (US)

(72) Inventor: Michael T. Piecuch, Hudson, NH (US)

(73) Assignee: 128 Technology, Inc., Burlington, MA (US)

( * ) Notice: Subject to any disclaimer, the term of this patent is extended or adjusted under 35 U.S.C. 154(b) by 73 days.

(21) Appl. No.: 15/168,495

(22) Filed: May 31, 2016

(51) Int. Cl.
*H04L 12/28* (2006.01)
*H04L 12/24* (2006.01)
*H04L 12/861* (2013.01)
*H04L 12/911* (2013.01)

(52) U.S. Cl.
CPC ...... *H04L 41/0813* (2013.01); *H04L 41/0886* (2013.01); *H04L 47/82* (2013.01); *H04L 49/90* (2013.01)

(58) Field of Classification Search
CPC . H04L 41/0813; H04L 41/0886; H04L 47/82; H04L 49/90
USPC ....................................................... 370/412
See application file for complete search history.

(56) References Cited

U.S. PATENT DOCUMENTS

| | | | |
|---|---|---|---|
| 6,515,963 B1 | 2/2003 | Bechtolsheim et al. |
| 6,563,824 B1 | 5/2003 | Bhatia et al. |
| 6,584,071 B1 | 6/2003 | Kodialam et al. |
| 6,687,220 B1 | 2/2004 | Ayres |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar ........................... 370/412 |
| 7,218,632 B1 | 5/2007 | Bechtolsheim et al. |
| 7,315,541 B1 | 1/2008 | Housel et al. |
| 7,317,730 B1 * | 1/2008 | Devanagondi .......... H04L 47/10 370/412 |
| 7,373,660 B1 | 5/2008 | Guichard et al. |

(Continued)

FOREIGN PATENT DOCUMENTS

| | | | |
|---|---|---|---|
| CN | 101552703 A | 10/2009 |
| CN | 101646220 A | 2/2010 |

(Continued)

OTHER PUBLICATIONS

Data Plane Development Kit, Programmer's Guide, Release 16.04.0, 216 pages, Apr. 12, 2016.

(Continued)

*Primary Examiner* — Christopher R Crompton
(74) *Attorney, Agent, or Firm* — Sunstein Kann Murphy & Timbers LLP

(57) ABSTRACT

A self-configuring router includes a resource allocator that automatically assigns processors to queues, such that queue workload is distributed as evenly as possible among the processors, and the processors are as fully utilized as possible. Consequently, packets do not remain on queues longer than necessary, thereby decreasing latency of packets traversing the router, and available and expensive resources, namely the processors, are kept busy. The router automatically allocates its own resources (processors) to its own queues.

8 Claims, 31 Drawing Sheets

(56) References Cited

U.S. PATENT DOCUMENTS

| | | |
|---|---|---|
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts |
| 8,094,560 B2 | 1/2012 | Bagepalli et al. ............ 370/235 |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 2001/0010692 A1* | 8/2001 | Sindhu ................ H04L 12/5601 370/395.7 |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0176363 A1 | 11/2002 | Durinovic-Johri et al. |
| 2003/0081624 A1 | 5/2003 | Aggarwal et al. |
| 2003/0191857 A1 | 10/2003 | Terrell et al. |
| 2003/0198189 A1 | 10/2003 | Roberts et al. |
| 2003/0214938 A1 | 11/2003 | Jindal et al. |
| 2004/0024873 A1* | 2/2004 | DiMambro ......... H04L 67/1027 709/225 |
| 2004/0088542 A1 | 5/2004 | Daude et al. |
| 2004/0264481 A1 | 12/2004 | Darling et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2008/0214175 A1 | 9/2008 | Papadoglou et al. |
| 2009/0007021 A1 | 1/2009 | Hayton |
| 2009/0059958 A1 | 3/2009 | Nakata |
| 2010/0125898 A1 | 5/2010 | Dubuc et al. |
| 2010/0191968 A1 | 7/2010 | Patil et al. |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0297824 A1 | 11/2013 | Lan et al. |
| 2014/0006545 A1* | 1/2014 | Zalcman ............ H04L 29/08549 709/214 |
| 2014/0040488 A1 | 2/2014 | Small et al. |
| 2014/0281385 A1* | 9/2014 | Tu ............................. G06F 9/38 712/43 |
| 2015/0188814 A1 | 7/2015 | Jain et al. |
| 2015/0229618 A1 | 8/2015 | Wan et al. |
| 2015/0381324 A1 | 12/2015 | Mirsky et al. |
| 2016/0094444 A1 | 3/2016 | MeLampy et al. |

FOREIGN PATENT DOCUMENTS

| | | | |
|---|---|---|---|
| CN | 101068242 B | 4/2010 | |
| CN | 102158371 A | 8/2011 | |
| CN | 101640629 B | 8/2012 | |
| CN | 102739507 A | 10/2012 | ............ H04L 12/56 |
| CN | 101207604 B | 3/2013 | |
| CN | 102769679 B | 6/2015 | |
| CN | 103179192 B | 11/2015 | |
| CN | 105245469 A | 1/2016 | |
| EP | 1 313 267 B1 | 12/2006 | |
| KR | 10-2011-0062994 A | 6/2011 | |
| WO | WO 2007/084707 A2 | 7/2007 | |
| WO | WO 2007/084755 A2 | 7/2007 | |
| WO | WO 2008/043230 A1 | 4/2008 | |
| WO | WO 2015/131537 A1 | 9/2015 | |

OTHER PUBLICATIONS

Hansson, et al., "A Unified Approach to Constrained Mapping and Routing on Network-on-Chip Architectures," CODES+ISSS '05 Proceedings of the 3$^{rd}$ IEEE/ACM/IFIP International Conference on Hardware/Software Codesign and System Synthesis, 6 pages, Sep. 19-21, 2005.

Microsoft, "Introduction to Receive Side Scaling," Developer Resources, https://msdn.microsoft.com/en-us/library/windows/hardware/ff556942(v=vs.85).aspx, 3 pages, Apr. 2014.

Microsoft, "RSS with a Single Hardware Receive Queue," Developer Resources, https://msdn.microsoft.com/en-us/library/windows/hardware/ff570727(v=vs.85).aspx, 2 pages, Jan. 2015.

Microsoft, "RSS with Hardware Queuing," Developer Resources, https://msdn.microsoft.com/en-us/library/windows/hardware/ff570728(v=vs.85).aspx, 2 pages, Jan. 2015.

Microsoft, "Non-RSS Receive Processing," Developer Resources, https://msdn.microsoft.com/en-us/library/windows/hardware/ff568798(v=vs.85).aspx, 2 pages, Jan. 2015.

Shaw, "Multi-queue network interfaces with SMP on Linux," Greenhost, https ://greenhost.net/2013/04/10/multi-queue-network-interfaces-with-smp-on-linux/, 5 pages, Apr. 10, 2013.

Srinivasan, et al. "A Technique for Low Energy Mapping and Routing in Network-on-Chip Architectures," ISLPED '05 Proceedings of the 2005 International Symposium on Low Power Electronics and Design, 6 pages, Aug. 8-10, 2005.

Wikipedia, "Network interface controller," https://en.wikipedia.org/wiki/Network_interface_controller, 5 pages, May 19, 2015.

Berners-Lee et al., *Uniform Resource Identifier (URI): Generic Syntax*, Network Working Group, Request for Comments 3986, The Internet Society, 61 pages, Jan. 2005.

Bjorklund *YANG—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfy/nfv_white_paper), 16 pages, dated Oct. 22, 2012.

Cisco Systems, *Parallel Express Forwarding on the Cisco 10000 Series*, (White Paper) Cisco Systems, printed Jun. 17, 2015, 4 pages.

Davis, *Layer 3 Switches Explained*, Happy Router, 6 pages, dated Aug. 30, 2007.

Filsfils et al., *Segment Routing Architecture*, Network Working Grroup, Draft, 28 pages, Oct. 21, 2013.

Herbert, *xps: Transmit Packet Steering*, Eklektix, Inc., Oct. 26, 2010, 11 pages.

Iana, *Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

PC Magazine Encyclopedia, *Definition of TCP/IP abc's*, PC Magazine Encyclopedia (www.pcmag.com/encyclopedia/term/52615), 5 pages, 2005.

Previdi, et al., *IPv6 Segment Routing Header (SRH)*, Network working Group, Draft, 24 pages, Jul. 3, 2014.

Roberts, *The Next Generation of IP—Flow Routing*, SSGRR2003S International Conference, L'Aquila Italy, 11 pages, Jul. 29, 2003.

(56) References Cited

OTHER PUBLICATIONS

Rouse, *What is routing table?*, Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Sollins et al., *Functional Requirements for Uniform Resource Names*, Network Working Group, Request for Comments 1737, 7 pages, Dec. 1994.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*, https://en.wikipedia.org/wiki/Active_queue_management, 2 pages, Apr. 22, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
Israel Patent Office, International Search Report, International Application No. PCT/US2017/027166, together with the Written Opinion of the International Searching Authority, dated Jul. 18, 2017, 8 pages.

\* cited by examiner

AIPR 1 708

Session X

Return Association (RA)

SSA    1.1.1.1

SSP    10

SDA    5.5.5.5

SDP    20

SPR    100

Forward Association (FA)

SSA    2.2.2.2      (implicit)

SSP    30          (session source port assigned by AIPR 1 708)

SDA    3.3.3.3      (next node address – AIPR 2 714)

SDP    40          (session destination port assigned by AIPR 1 708)

SPR    100

Flag = First Waypoint AIPR

Session Y

RA

FA

Flag

Session Z

RA

FA

Flag

*Figure 9*

AIPR 2 714

Session X

Return Association (RA)

SSA    2.2.2.2

SSP    30

SDA    3.3.3.3      (implicit)

SDP    40

SPR    100

Forward Association (FA)

SSA    3.3.3.3      (implicit)

SSP    50          (session source port assigned by AIPR 2 714)

SDA    4.4.4.4      (next node address – AIPR 4 722))

SDP    60          (session destination port assigned by AIPR 2 714)

SPR    100

Flag = Intermediate Waypoint AIPR

Session Y

RA

FA

Flag

Session Z

RA

FA

Flag

*Figure 10*

AIPR 4 722

Session X

Return Association (RA)

SSA   3.3.3.3

SSP   50

SDA   4.4.4.4        (implicit)

SDP   60

SPR   100

Forward Association (FA)

SSA   1.1.1.1        (original source address from metadata)

SSP   10           (original source port from metadata)

SDA   5.5.5.5        (original destination address from metadata)

SDP   20           (original destination port from metadata)

SPR   100

Flag = Final Waypoint AIPR

Session Y

RA

FA

Flag

Session Z

RA

FA

Flag

*Figure 11*

|  | QID0 | QID1 | QID2 | QID3 |
|---|---|---|---|---|
| Network Interface ID0 | 0 | 1 | 2 | 3 |
| Network Interface ID1 | 1 | 2 | 3 | 0 |
| Network Interface ID2 | 2 | 3 | 0 | 1 |
| Network Interface ID3 | 3 | 0 | 1 | 2 |

*Figure 29*

|  | QID0 | QID1 | QID2 | QID3 | QID4 | QID5 | QID6 | QID7 | QID8 | QID9 | QID10 | QID11 | QID12 | QID13 | QID14 | QID15 | QID16 |
|---|---|---|---|---|---|---|---|---|---|---|---|---|---|---|---|---|---|
| Network Interface ID0 | 0 | 5 | 10 | 1 | 6 | 11 | 2 | 7 | 12 | 3 | 8 | 13 | 4 | 9 | 14 | 15 | 16 |
| Network Interface ID1 | 1 | 6 | 11 | 2 | 7 | 12 | 3 | 8 | 13 | 4 | 9 | 14 | 5 | 10 | 15 | 16 | 0 |
| Network Interface ID2 | 2 | 7 | 12 | 3 | 8 | 13 | 4 | 9 | 14 | 5 | 10 | 15 | 6 | 11 | 16 | 0 | 1 |
| Network Interface ID3 | 3 | 8 | 13 | 4 | 9 | 14 | 5 | 10 | 15 | 6 | 11 | 16 | 7 | 12 | 0 | 1 | 2 |
| Network Interface ID4 | 4 | 9 | 14 | 5 | 10 | 15 | 6 | 11 | 16 | 7 | 12 | 0 | 8 | 13 | 1 | 2 | 3 |

*Figure 30*

SELF-CONFIGURING COMPUTER NETWORK ROUTER

FIELD OF THE INVENTION

The invention generally relates to computer network routers and, more particularly, the invention relates to self-configuring computer network routers that automatically allocate resources, in particular processors, to handle queues of incoming data.

BACKGROUND OF THE INVENTION

Routers include network interfaces, to which links from other routers may be connected. The network interfaces are typically handled by device drivers (software) executed by processors. The network interfaces and/or the device drivers enqueue packets received by the network interfaces onto queues for subsequent processing. For example, the subsequent processing may involve simply enqueuing the packet for transmission by an outgoing network interface, or the processing may be more complex, such as resolving the packet's destination address.

Each queue may be handled by a different processor. Distributing the incoming packets across a plurality of queues, and therefore a plurality of processors, enables the incoming packets to be processed more quickly than if a single processor handled all the packets received by the network interfaces. Such a scheme is used in the well-known receive side scaling (RSS) network driver technology.

However, with more than one network interface, the queue-to-processor assignment task becomes complex. Assigning processors to queues of multiple network interfaces poses problems. Typically, fewer processors are available than queues. Therefore, most or all of the processors handle multiple queues. However, assigning a given processor to handle two or more queues associated with one network interface provides no advantage and can decrease performance. Furthermore, unequally distributing the processors to the queues can cause delays of packets, or dropping of packets, received by network interfaces that are underserved by the processors. On the other hand, assigning excessive numbers of processors to some of the queues, at the expense of other queues, wastes valuable processor resources.

No known prior art assignment scheme, such as round-robin assignment of processors in numerical order to queues, is likely to evenly distribute the workload across the processors. Consequently, some of the processors can be overloaded, while other processors remain idle or only lightly loaded.

SUMMARY OF VARIOUS EMBODIMENTS

In accordance with an embodiment of the invention, provides a self-configuring router. The router includes a plurality of P processors and a memory coupled to the plurality of P processors. "P" represents a number of the processors. Each processor of the plurality of P processor has a normalized processor identifier. The router includes a plurality of queues represented by data stored in the memory. Each queue of the plurality of queues has a normalized queue identifier.

The router also includes a plurality of N network interfaces. "N" represents a number of the network interfaces. Each network interface of the plurality of N network interfaces has a normalized network interface identifier. Each network interface of the plurality of N network interfaces is associated with at least one queue of the plurality of queues. Each network interface of the plurality of N network interfaces is configured to automatically enqueue messages received by the network interface onto the at least one queue associated with the network interface.

The router also includes a resource allocator. The resource allocator is configured to automatically calculate processor identifiers. The resource allocator is configured to automatically calculate a processor identifier for each combination of: (a) a network interface of the plurality of N network interfaces and (b) a queue of the plurality of queues. Each calculated processor identifier is a processor identifier of a respective processor of the plurality of P processors.

The resource allocator is configured to automatically calculate the processor identifiers based on: (1) the normalized queue identifier of the queue of the network interface/queue combination, (2) the normalized network interface identifier of the network interface associated with the queue, (3) the number N of network interfaces in the plurality of N network interfaces, (4) the number P of processors in the plurality of P processors and (5) a result of a modulo calculation involving the number P.

The resource allocator is configured to assign the processor having the calculated processor identifier to the network interface/queue combination. The assigned processor is assigned to dequeue and process messages on the queue of the interface/queue combination.

At least one network interface of the plurality of N network interfaces may be associated with at least two queues of the plurality of queues.

The resource allocator may include a processor.

Each processor of the plurality of processors may have a normalized processor identifier. For each network interface/queue combination, the resource allocator may perform several operations. The resource allocator may calculate a group spacing as a quotient calculated by dividing the number P of processors by the number N of network interfaces. If the quotient is less than 1, the resource allocator may set the group spacing to 1. The resource allocator may set an offset to the normalized queue identifier of the queue of the network interface/queue combination. The resource allocator may calculate a group position as a quotient calculated by dividing the normalized queue identifier of the queue of the network interface/queue combination by the group spacing. The resource allocator may truncate the quotient to an integer.

The resource allocator may compare the group position to the number N of network interfaces. If, as a result of the comparison, the group position is found to be less than the number N of network interfaces, the resource allocator may set the offset to a value according to the formula: ((the normalized queue identifier MODULO the group spacing) *the number N of network interfaces)+the group position.

The resource allocator may calculate a temporary value according to the formula: (the offset+the normalized network interface identifier) MODULO the number P of processors.

The resource allocator may assign the processor having a normalized processor identifier equal to the temporary value to the network interface/queue combination.

Another embodiment of the present invention provides a method for automatically managing hardware resources within a router. The method includes storing data in a memory of the router. The data represents a plurality of queues. A respective normalized queue identifier is assigned to each queue of the plurality of queues.

The router includes a plurality of available processors. The method includes ascertaining a number P of the processors available in the router.

The router includes a plurality of available network interfaces. The method includes ascertaining a number N of network interfaces available in the router and assigning to each network interface of the N network interfaces a respective normalized network interface identifier. Each network interface of the N network interfaces is associated with at least one queue of the plurality of queues. Each network interface of the N network interfaces is configured to enqueue messages received by the network interface onto the queue(s) associated with the network interface.

For each combination of: (a) a network interface of the N network interfaces and (b) a queue of the plurality of queues, a processor identifier of a respective processor of the P processors is calculated. The calculation is based on: (a) the normalized queue identifier of the queue of the network interface/queue combination, (b) the normalized network interface identifier of the network interface associated with the queue, (c) the number N of network interfaces and (d) the number P of processors available in the router, as well as a result of a modulo calculation involving the number P.

The processor of the P processors having the calculated processor identifier is assigned to dequeue and process messages on the queue of the network interface/queue combination.

Associating each network interface of the N network interfaces with at least one queue of the plurality of queues may include associating at least one network interface of the N network interfaces with at least two queues of the plurality of queues.

A respective normalized processor identifier may be assigned to each processor of the P processors. Assigning the respective processor of the P processors to dequeue and process messages on the queue of the network interface/queue combination may include performing a set of operations for each network interface/queue combination. The operations may include calculating a group spacing as a quotient by dividing the number P of processors by the number N of network interfaces. If the quotient is less than 1, the group spacing may be set to 1. The operations may also include setting an offset to the normalized queue identifier of the queue of the network interface/queue combination. In addition, a group position may be calculated as a quotient by dividing the normalized queue identifier of the queue of the network interface/queue combination by the group spacing and truncating the quotient to an integer.

The group position may be compared to the number N of network interfaces. If, as a result of the comparing, the group position is found to be less than the number N of network interfaces, the offset may be set to a value according to the formula: ((the normalized queue identifier MODULO the group spacing)*the number N of network interfaces)+the group position.

A temporary value may be calculated according to the formula: (the offset+the normalized network interface identifier) MODULO the number P of processors.

A processor having a normalized processor identifier equal to the temporary value may be assigned to dequeue and process the messages on the queue of the network interface/queue combination.

Illustrative embodiments of the invention are implemented as a computer program product having a computer usable medium with computer readable program code thereon. The computer readable code may be read and utilized by a computer system in accordance with conventional processes.

Yet another embodiment of the present invention provides a non-transitory computer-readable medium encoded with instructions. When the instructions are executed by a processor, the instructions establish processes for performing a computer-implemented method of managing hardware resources in a router. The processes include a process storing data in a memory of the router. The data represents a plurality of queues. The processes also include a process assigning to each queue of the plurality of queues a respective normalized queue identifier.

The processes also include a process ascertaining a number P of processors available in the router and a process ascertaining a number N of network interfaces available in the router, as well as a process assigning to each network interface of the N network interfaces a respective normalized network interface identifier.

The processes also include a process associating each network interface of the N network interfaces with at least one queue of the plurality of queues.

The processes also include a process configuring each network interface of the N network interfaces to enqueue messages received thereby onto the queue(s) associated with the network interface.

The processes also include a process, for each network interface/queue combination of the N network interfaces and the plurality of queues, that (1) calculates a processor identifier of a respective processor of the P processors and (2) assigns the processor of the P processors having the calculated processor identifier to dequeue and process messages on the queue of the network interface/queue combination.

The calculation is based on: (a) the normalized queue identifier of the queue of the network interface/queue combination, (b) the normalized network interface identifier of the network interface associated with the queue, (c) the number N of network interfaces and (d) the number P of processors available in the router; and a result of a modulo calculation involving the number P.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with an AIPR 1 based on the lead packet processing of FIG. 8.

FIG. 10 is a schematic diagram showing session-related data associated with another AIPR based on the lead packet processing of FIG. 8.

FIG. 11 is a schematic diagram showing session-related data associated with yet another AIPR based on the lead packet processing of FIG. 8.

FIGS. 29 and 30 provide examples of normalized processor identifier assignments for some exemplary configurations of network interfaces and numbers of queues for each network interface, i.e., filled-in tables of FIG. 27, according to an embodiment of the present invention.

DESCRIPTION OF ILLUSTRATIVE EMBODIMENTS

Embodiments of the present invention improve performance and efficiency of network routers. According to the present invention, a self-configuring router includes a resource allocator that automatically assigns processors to queues, such that queue workload is distributed as evenly as possible among the processors, and the processors are as fully utilized as possible. Consequently, packets do not remain on queues longer than necessary, thereby decreasing latency of packets traversing the router, and available and expensive resources, namely the processors, are kept busy. A router that includes such a resource allocator is referred to as a "self-configuring router," because the router automatically allocates its own resources (processors) to its own queues.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. For example, nodes in a network may be within a single device, such as instances of a router inside a hardware router, and/or nodes in the Internet (e.g., routers) as discussed below. Many networks also include switches, which are largely transparent for purposes of this discussion. However, some switches also perform routing functions. For the present discussion, such routing switches are considered routers. Routers are described below.

Figure 1:
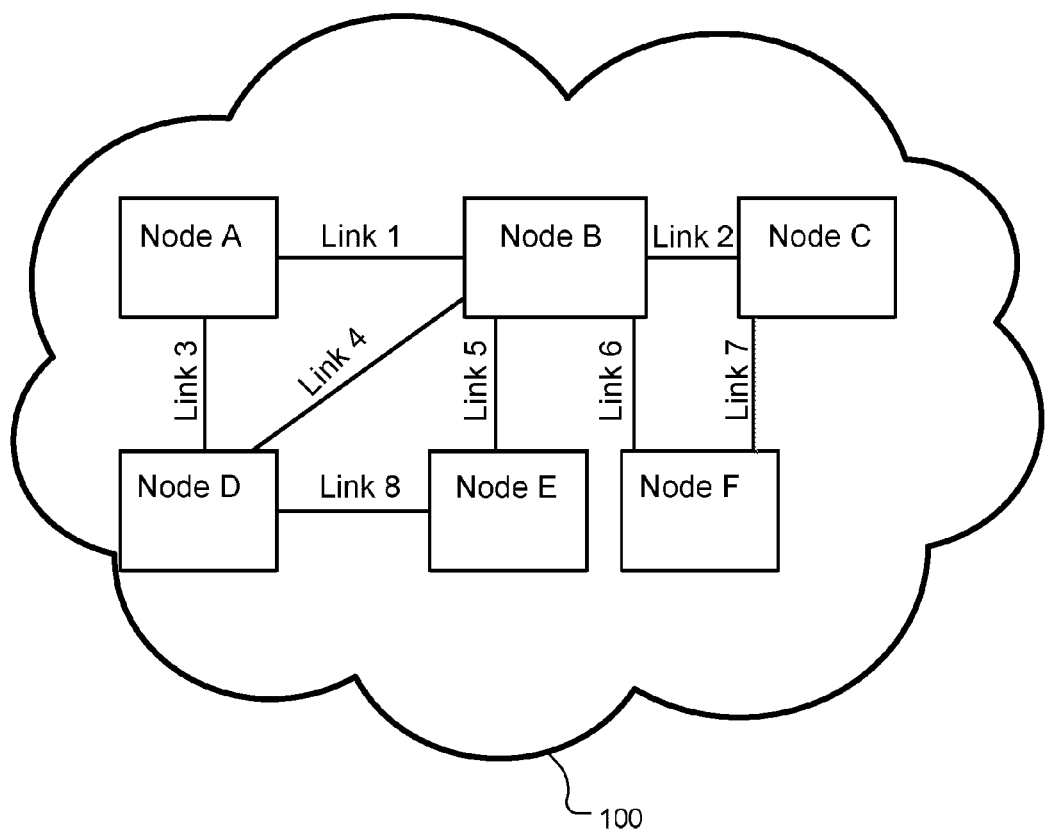
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
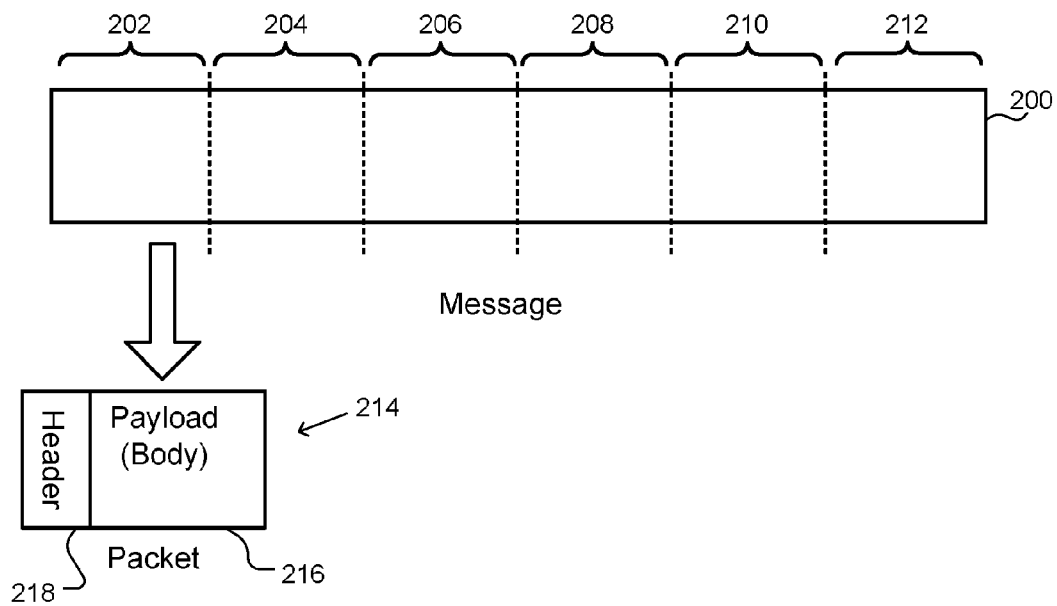
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. The Term "network interface" means a real (physical) or virtual (software-implanted interface). At Layer 2 (Data Link Layer), each network interface has an address, such as a media access control (MAC) address. On the other hand, at Layer 3 using IP, each network interface, or at least each node, has an IP address. Layer 3 converts IP addresses to MAC addresses.

Figure 3:
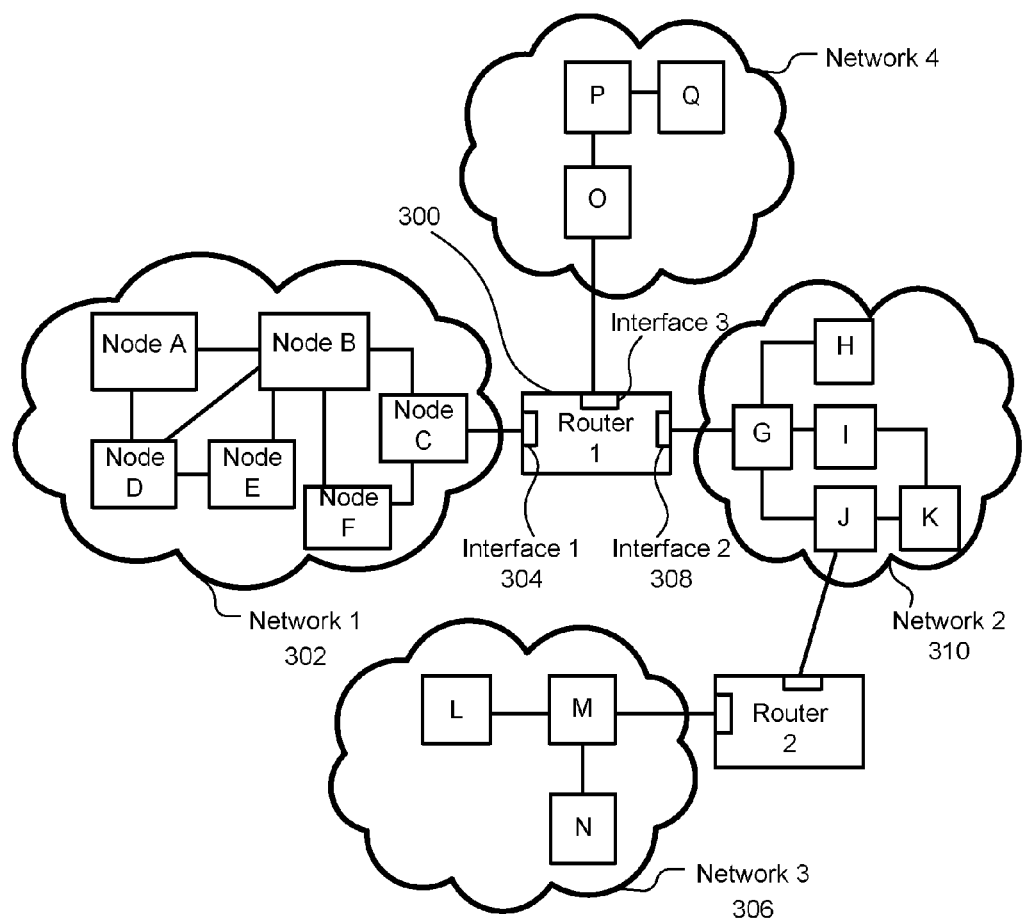
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two network interfaces; i.e., one where each network interface connects the router to a different network, as exemplified in FIG. 3. When a router receives a packet via one network interface from one network, it uses information stored in its routing table to direct the packet to another network via another network interface. The routing table thus contains network/next hop associations. These associations tell the router that a particular destination can optimally be reached by sending the packet to a specific router that represents a next hop on the way to the final destination. For example, if Router 1 (300) receives a packet, via its Interface 1 (304), from Network 1 (302), and the packet is destined to a node in Network 3 (306), the Router 1 (300) consults its router table and then forwards the packet via its Interface 2 (308) to Network 2 (310). Network 2 (310) will then forward the packet to Network 3 (306). Interface 1, Interface 2 and Interface 3 are respective network interfaces. The next hop association can also be indicated in the routing table as an outgoing (exit) network interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured.

As noted, when a router receives a packet via one network interface from one network, the router uses its routing table to direct the packet to another network. Table 1 lists information typically found in a basic IP routing table (stored in memory).

TABLE 1

| | |
|---|---|
| Destination | Partial IP address (Expressed as a bit-mask) or Complete IP address of a packet's final destination |
| Next hop | IP address to which the packet should be forwarded on its way to the final destination |

TABLE 1-continued

| | |
|---|---|
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which network interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hops suffices to deliver packets anywhere in a network. Hop-by-hop routing is a fundamental characteristic of the IP Internetwork Layer and the OSI Network Layer. As noted above and discussed below, however, there may be a number of possible next hop node options. Accordingly, in some embodiments, the next hop node selected for a given session can be determined based on a number of factors, such as the traffic and load on a number of potential next hop nodes.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet, or between two successive packets of a message, such as if a router becomes congested or a link fails. Two packets of a message may, therefore, in some cases, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow paths different from the packets from the source node to the destination node.

In many situations, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services, and file transfer (FTP) services. Each service is typically assigned a port number, in the range 0-65,535, that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Self-Configuring Router

Figure 4:
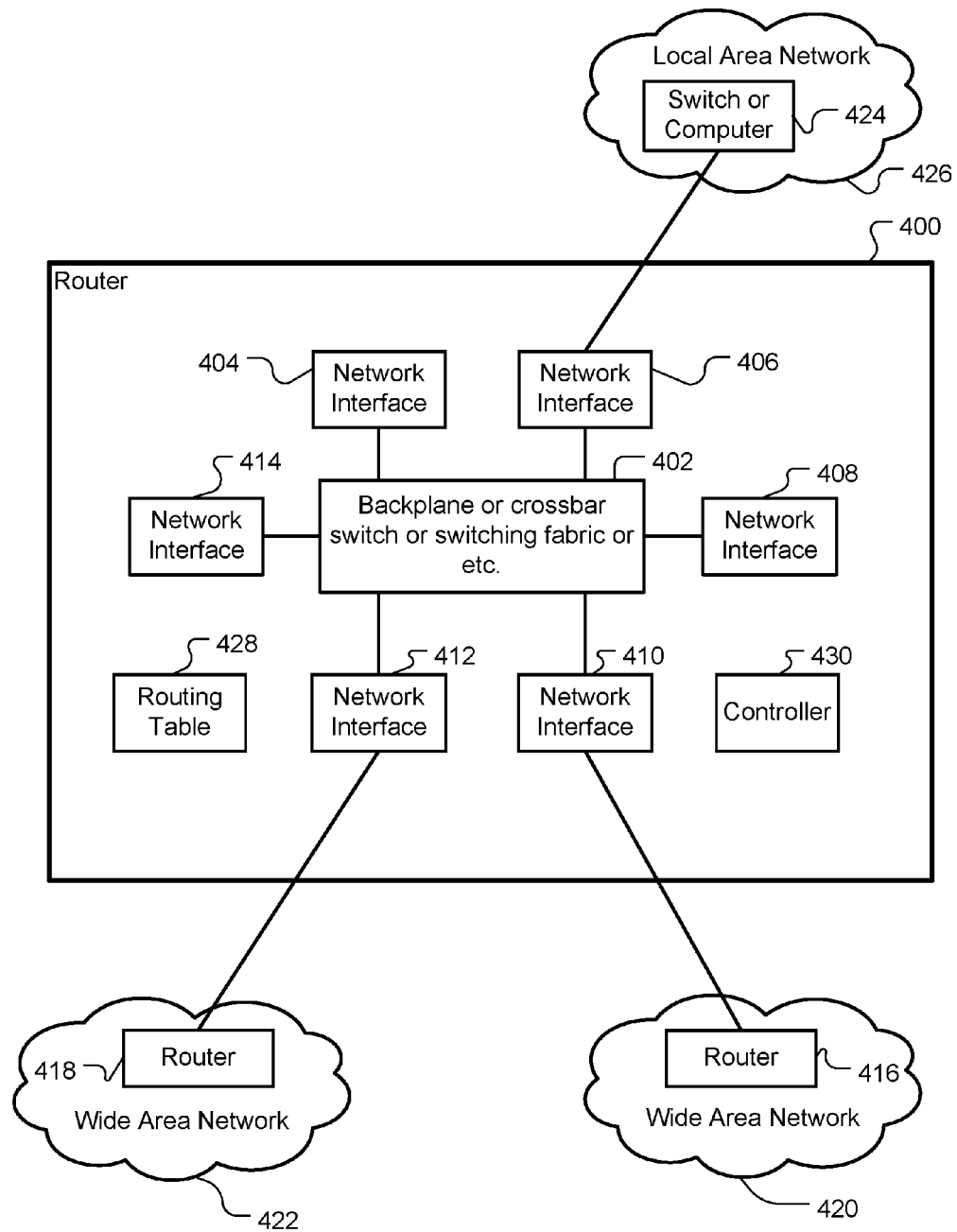
FIG. 4 is a schematic block diagram of a computer network router, according to the prior art.

As noted, a router typically acts as a network node that interconnects two or more distinct networks or two or more sub-networks (subnets) of a single network. FIG. 4 is a schematic block diagram of an exemplary conventional dedicated-function hardware-based computer network router 400. The router 400 includes a backplane, crossbar switch, switching fabric or other fast interconnect component 402. The router 400 also includes a plurality of network interfaces 404, 406, 408, 410, 412 and 414, each connected to the fast interconnect component 402.

Each network interface 404-414 may be electrically coupled to another network interface in another router or some other network node, such as a switch or computer, to establish a network connection between the router 400 and the other component. For example, network interfaces 410 and 412 are shown connected to respective routers 416 and 418 in respective wide area networks (WANs) 420 and 422. Similarly, network interface 408 is shown connected to a switch or computer 424 in a local area network (LAN) 426.

The router 400 includes a routing table 428 and a controller 430. The controller 430 uses information in the routing table 428 to route packets received by the network interfaces 404-414 toward their respective destinations. For example, the controller 430 can use the destination address in a packet to index into the routing table 428 and thereby ascertain an outgoing network interface 404-414 that should be used to forward the packet. The controller 430 then commands the fast interconnect component 402 to establish a link between the network interface 404-414 on which the packet was received and the network interface 404-414 on which the packet should be sent.

Instead of using dedicated-function routers, router functions have been virtualized by performing some or all of the functions described with respect to FIG. 4 by one or more processors in so-called "software routers." However, regardless of whether a router is implemented in dedicated-function hardware or in a virtual machine, each network interface 404-414 is typically handled by a device driver that enqueues incoming packets onto one or more queues for subsequent processing. The subsequent processing may involve simply enqueuing the packet for transmission by an outgoing network interface, or the processing may be more complex, such as resolving the packet's destination address.

Figure 5:
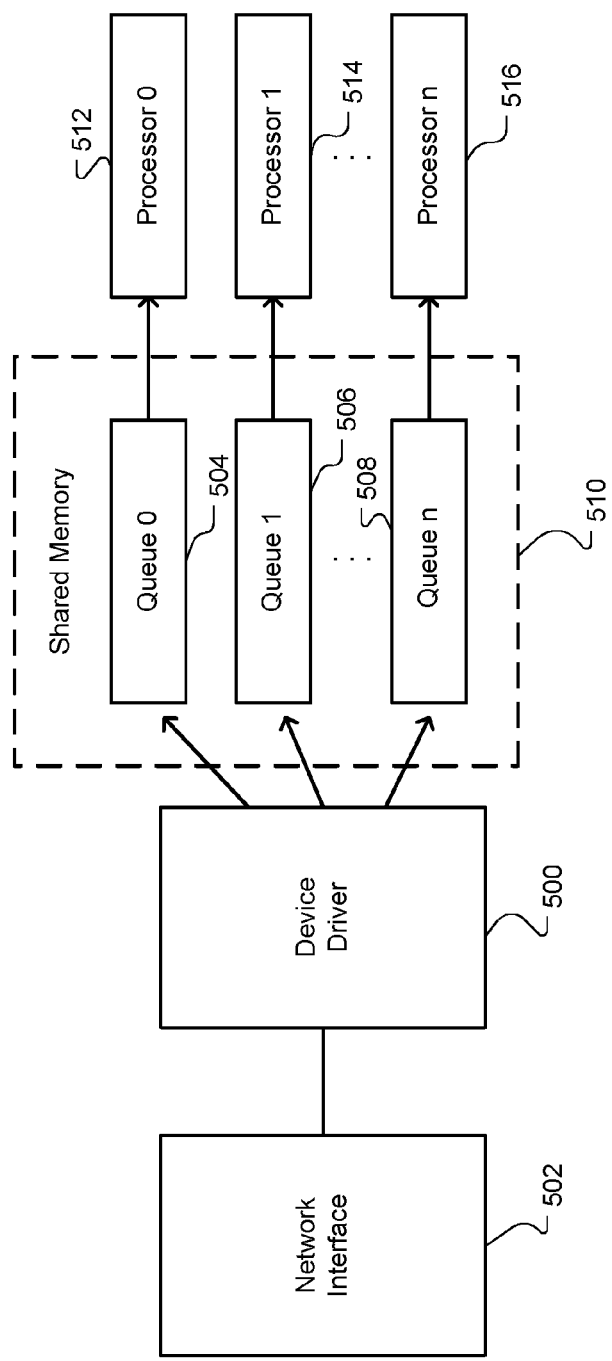
FIG. 5 is a schematic block diagram of queues, on which incoming data is enqueued by a network interface of the router of FIG. 4, as well as an assignment to processors to the queues, according to the prior art.

FIG. 5 is a block diagram schematically illustrating how an exemplary device driver 500 enqueues packets received by an exemplary network interface 502 onto a set of queues, represented by exemplary queues 504, 506 and 508. The queues 504-508 may be stored in shared memory 510 that is accessible by a plurality of processors, represented by exemplary processors 512, 514 and 516. Each queue 504-510 is assigned to one of the processors 512-516 for processing. Distributing the incoming packets across a plurality of queues 504-508, and therefore a plurality of processors 512-516, enables the incoming packets to be processed more quickly than if a single processor handled all the packets received by the network interface 502. Such a scheme is used in the well-known receive side scaling (RSS) network driver technology.

With one network interface 502, the number of queues 504-508 is typically determined by the number of available processors 512-516, and the assignment of queues to processors is straight forward. However, as schematically illustrated in FIG. 6, with more than one network interface, the queue-to-processor assignment task becomes complex.

Figure 6:
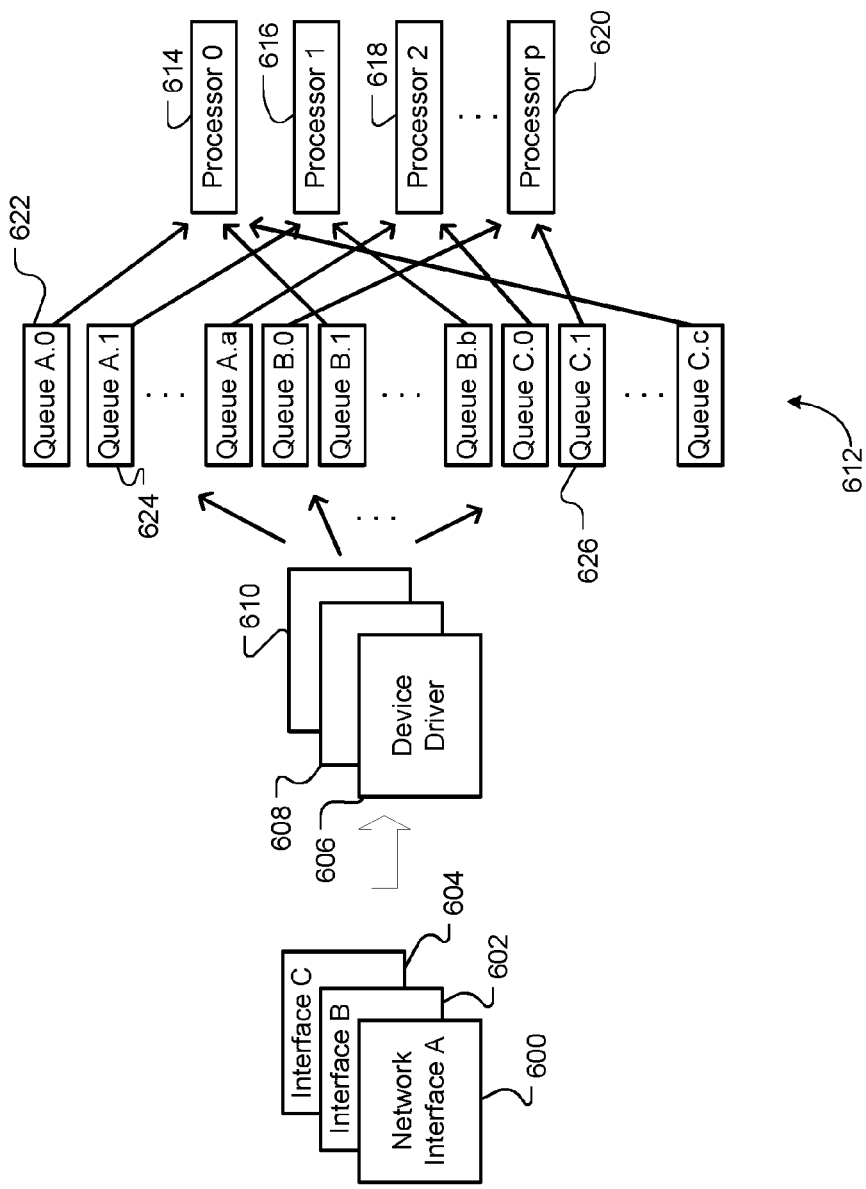
FIG. 6 is a schematic block diagram of queues, such as the queues of FIG. 5, for several network interfaces of the router of FIG. 4, as well as assignments of processors to the queues, according to the prior art.

In the example shown in FIG. 6, three network interfaces 600, 602 and 604 are handled by respective device drivers 606, 608 and 610, and the device drivers 606-610 enqueue packets received by the network interfaces 600-604 on queues, generally indicated at 612. The number of queues 612 per network interface 600-604 need not be equal for all the network interfaces 600-604. For example, some of the network interfaces 600-604 may have only one queue 612 each, whereas other of the network interfaces 600-604 may have multiple queues 612. A number (p) of processors, represented by processors 614, 616, 618 and 620, is available for processing received packets.

The queues 612 are not thread safe. That is, each queue 612 should be accessed by only one processor 614-620. Although spinlocks or other locking mechanisms could be used to make the queues 612 thread safe, i.e., provide one-processor-at-a-time shared access by multiple processors 614-620 to each queue 612, the performance penalty of such locking mechanisms typically precludes their use. Therefore, by convention, each queue 612 is assigned to exactly one processor 614-620. However, in the prior art, typically nothing but convention prevents multiple processors from being assigned to one queue, with potentially disastrous consequences.

In FIG. 6, each network interface 600-604 is given a letter designation (A, B or C), and each queue 612 is numbered (0, 1, 2, 3, . . . ) and given a designation (A, B or C) that identifies the network interface 600-604 from which data packets are enqueued. The letter and number designations are combined. For example, queue 622 is designated "A.0" to indicate the queue 622 handles packets enqueued from network interface 600 (A), and the queue 622 is the 0th queue that handles packets from the network interface 600 (A). Similarly, queue 624 is designated "A.1" to indicate the queue 624 handles packets enqueued from network interface 600 (A), and the queue 624 is the 1st queue that handles packets from the network interface 600 (A). Likewise, queue 626 is designated "C.1" to indicate the queue 626 handles packets enqueued from network interface 604 (C), and the queue 624 is the 1st queue that handles packets from the network interface 604 (C).

Unlike the simple case of a single network interface discussed with respect to FIG. 5, in the prior art, assigning processors 614-620 to queues 612 of multiple network interfaces 600-604 poses problems. Typically, fewer processors 614-620 are available than queues 612. Therefore, most or all of the processors 614-620 handle multiple queues. However, assigning a given processor 614-620 to handle two or more queues associated with one network interface 600-604 provides no advantage and can decrease performance. Unequally distributing the processors 600-604 to the queues 612 can cause delays of packets, or dropping of packets, received by network interfaces 600-604 that are underserved by the processors 614-620. Assigning excessive numbers of processors 600-604 to some of the queues 612, at the expense of other queues 612, wastes valuable processor resources.

No known prior art assignment scheme, such as round-robin assignment of processors 614-620 in numerical order to queues 612, is likely to evenly distribute the workload across the processors 614-620. Consequently, some of the processors 614-620 can be overloaded, while other of the processors 614-620 remain idle or only lightly loaded.

Embodiments of the present invention include resource allocators that automatically assign processors to queues, such that queue workload is distributed as evenly as possible among the processors and the processors are as fully utilized as possible. Consequently, packets do not remain on queues longer than necessary, thereby decreasing latency of packets traversing a router, fewer packets are dropped and available and expensive resources, namely the processors, are kept busy. Thus, these embodiments improve performance and efficiency of network routers. The processor-to-queue assignments are performed automatically by a resource allocator. A router that includes such a resource allocator is referred to as a self-configuring router, because the router automatically allocates its own resources (processors) to its own queues.

An embodiment of a self-configuring router that includes a resource allocator will be described in the context of a software router. However, principles described herein are equally applicable to dedicated-function hardware-based routers.

Figure 24:
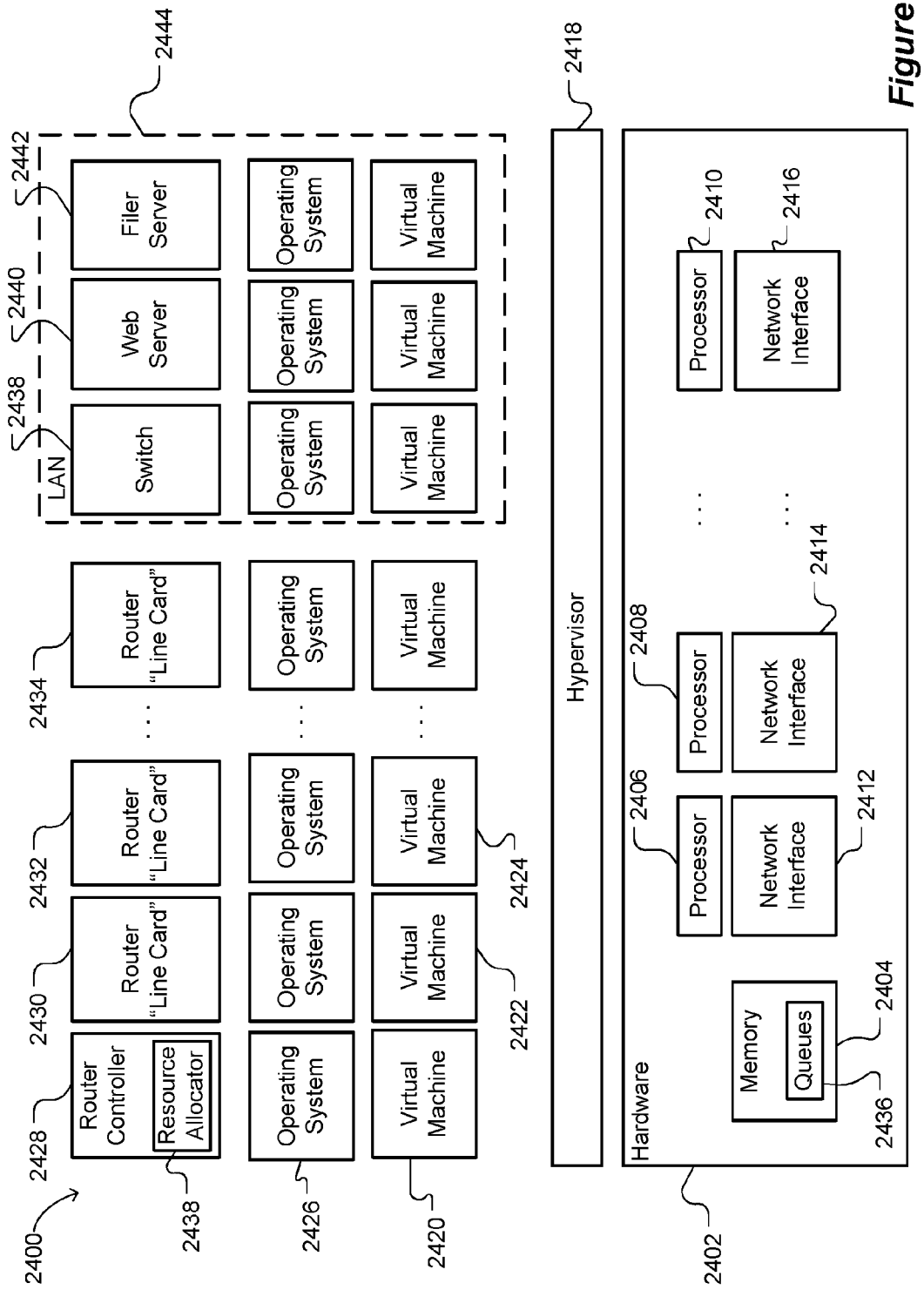
FIG. 24 is a schematic block diagram of a router, according to an embodiment of the present invention.

FIG. 24 is a schematic block diagram of a router 2400, according to an embodiment of the present invention. The router 2400 is implemented as a combination of hardware components 2402 and software modules. The hardware components 2402 include a memory 2404 and a plurality of processors, exemplified by processors 2406, 2408 and 2410. The hardware components 2402 may also include one or more network interfaces, exemplified by network interfaces 2412, 2414 and 2416, by which the router 2400 may be connected via one or more physical links to other network routers, etc.

Using well-known techniques, a hypervisor 2418 makes one or more of the processors 2406-2410, and at least a portion of the memory 2404, available to each of a plurality of virtual machines, exemplified by virtual machines 2420, 2422 and 2424. Also by well-known techniques, the hypervisor 2418 may make available ones of the network interfaces 2412-2416 to ones of the virtual machines 2420-2424. Optionally, a respective operating system, exemplified by operating system 2426, is executed by each virtual machine 2420-2424 in a conventional manner.

One virtual machine 2420 executes a router controller module 2428, and other virtual machines 2422, 2424, etc. execute respective router "line card" modules, exemplified by router line card modules 2430, 2432 and 2434. The router line card modules perform at least some of the functions that are performed by conventional hardware-based router line cards. It should be noted that the configuration of the hardware components 2402, i.e., the number of processors 2406-2410 and the number of network interfaces 2412-2416, as well as the number of router line card modules 2430-2434, is exemplary for a hypothetical router, and other embodiments may include other numbers of these components.

Referring momentarily back to FIG. 4, in some conventional routers, each network interface 404-414 is constructed on a separate plug-in circuit board often referred to as a "line card." A hardware line card includes circuitry to send and receive electrical or optical signals over network links, modulate and demodulate these signals, accumulate received data into packets, serialize data in packets that are to be transmitted, in some cases buffer received data, transfer received data to memory, such as via direct memory access (DMA), generate interrupt signals to indicate to a processor when a DMA transfer has been completed, in some cases perform protocol analysis, such as on headers of packets, and the like. Essentially, each hardware line card provides send and receive capability over a single network link.

Returning to FIG. 24, the router line card modules 2430-2434 provide capabilities analogous to at least some of the capabilities of the hardware line cards in a conventional router. That is, each router line card module 2430-2434 provides send and receive capability over a single network link. The link may extend via one of the network interfaces 2412-2416 to a node external to the router 2400 or, via a bus (not shown) that interconnects the hardware components 2402, between pairs of the router line card modules 2430-2434. The well-known Data Plane Development Kit (DPDK) may be used to implement portions of the line card modules 2430-2434. Alternatively, rather than executing the line card modules 2430-2434 by the virtual machines 2420-2424, the line card modules may be executed directly by "bare metal" processors, with or without operating systems.

Device drivers being executed by the virtual machines 2420-2424 manipulate data in the memory 2404 that represent a plurality of queues 2436. These device drivers and queues 2436 are analogous to the device drivers 606-610 and queues 612 described with reference to FIG. 6. Thus, packets received by the network interfaces 2412-2416 are represented by entries in the queues 2436, also referred to herein as "receive queues." Similarly, packets enqueued by the router line card modules 2430-2434 for transmission by the network interfaces 2412-2416 are represented by entries in the queues 2436, also referred to herein as "transmit queues." The queues 2436 may also be used for packets that are transmitted between pairs of the router line card modules 2430-2434.

As noted, assigning processors, such as processors 2406-2410, to queues, such as queues 2436, poses problems, which are solved by the disclosed resource allocator. In some embodiments, the router controller module 2428 includes a resource allocator 2438. In other embodiments, another component includes the resource allocator. For example, in some embodiments, a one-time process executes when the router 2400 is initialized. The one-time process may establish the virtual machines 2420-2424, perform other provisioning tasks and execute the resource allocator.

Figure 25:
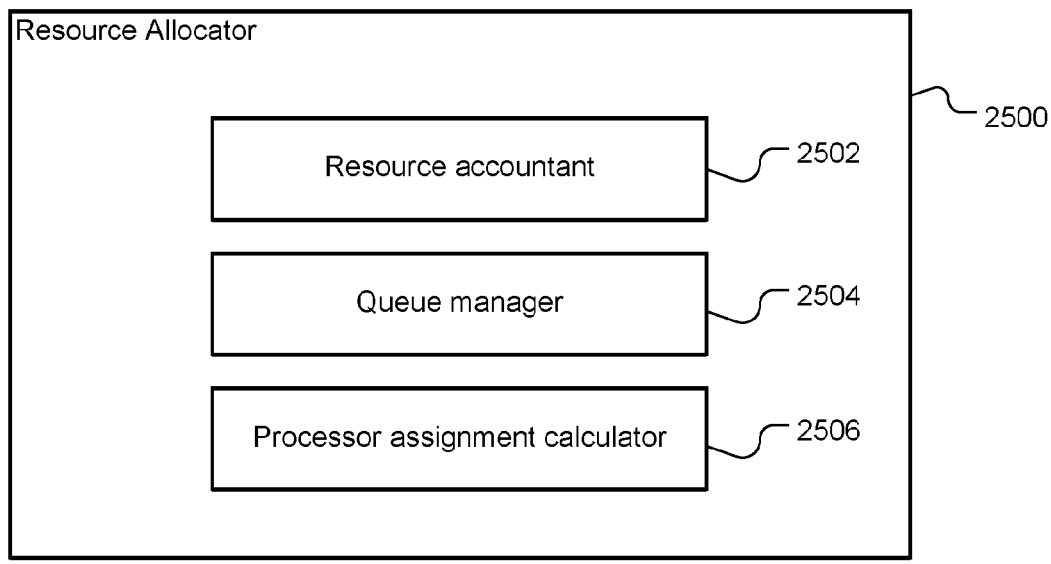
FIG. 25 is a schematic block diagram of a resource allocator of the router of FIG. 24, according to an embodiment of the present invention.

FIG. 25 is a schematic block diagram of a resource allocator 2500, according to an embodiment of the present invention. The resource allocator 2500 includes a resource accountant 2502, a queue manager 2504 and a processor assignment calculator 2506. As noted, the resource allocator 2500 may be implemented by a processor executing instructions stored in a computer memory. Alternatively, part or all of the resource allocator 2500 may be implemented in firmware or in hardware, such as combinatorial logic, a field-programmable gate array (FPGA), an application-specific integrated circuit (ASIC) or another suitable electronic or photonic circuit.

Figure 26A:
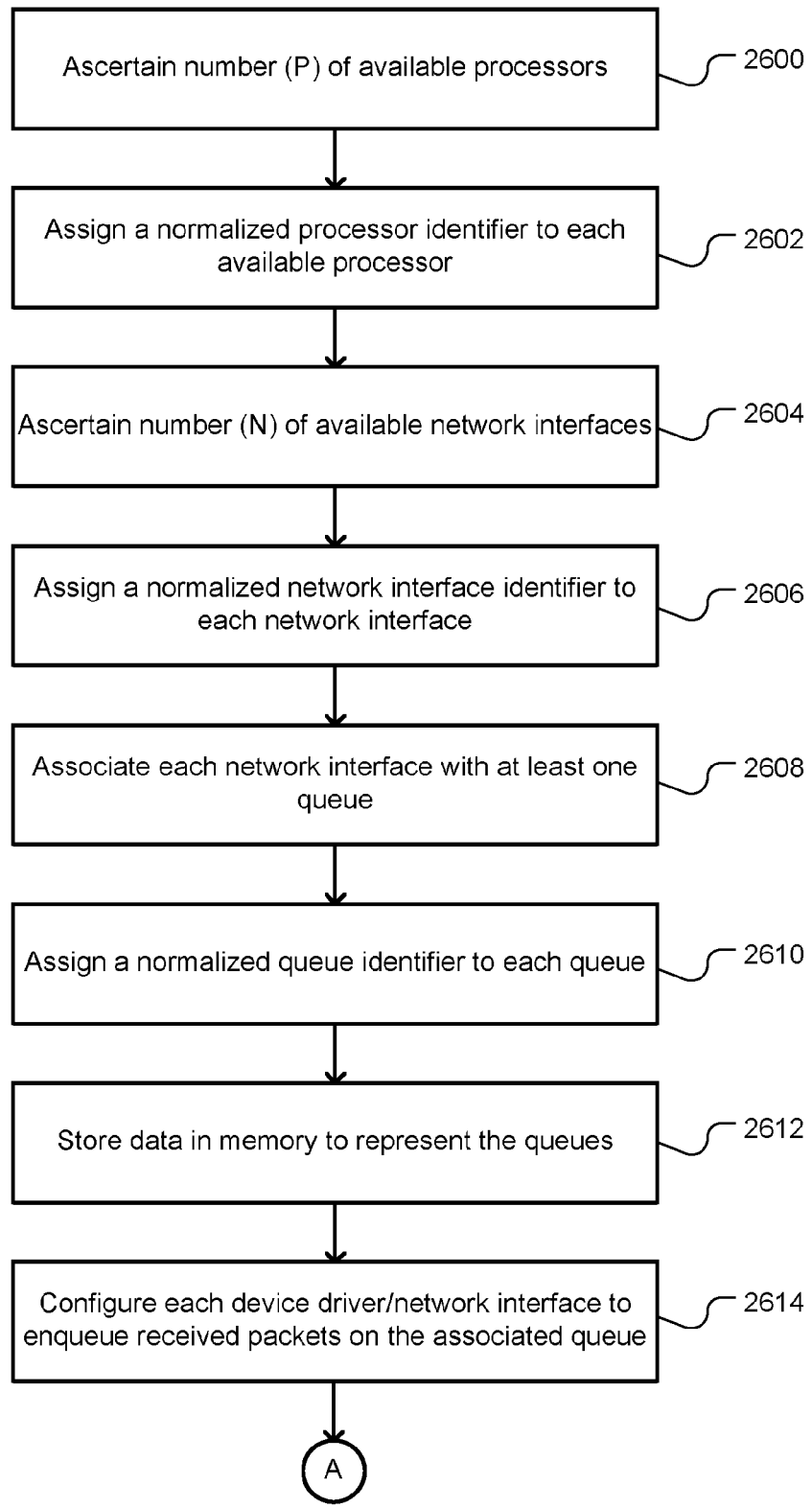
FIGS. 26A and 26B (collectively FIG. 26) is a flowchart schematically illustrating operations performed by the resource allocator of FIG. 25, according to an embodiment of the present invention.
Figure 26B:
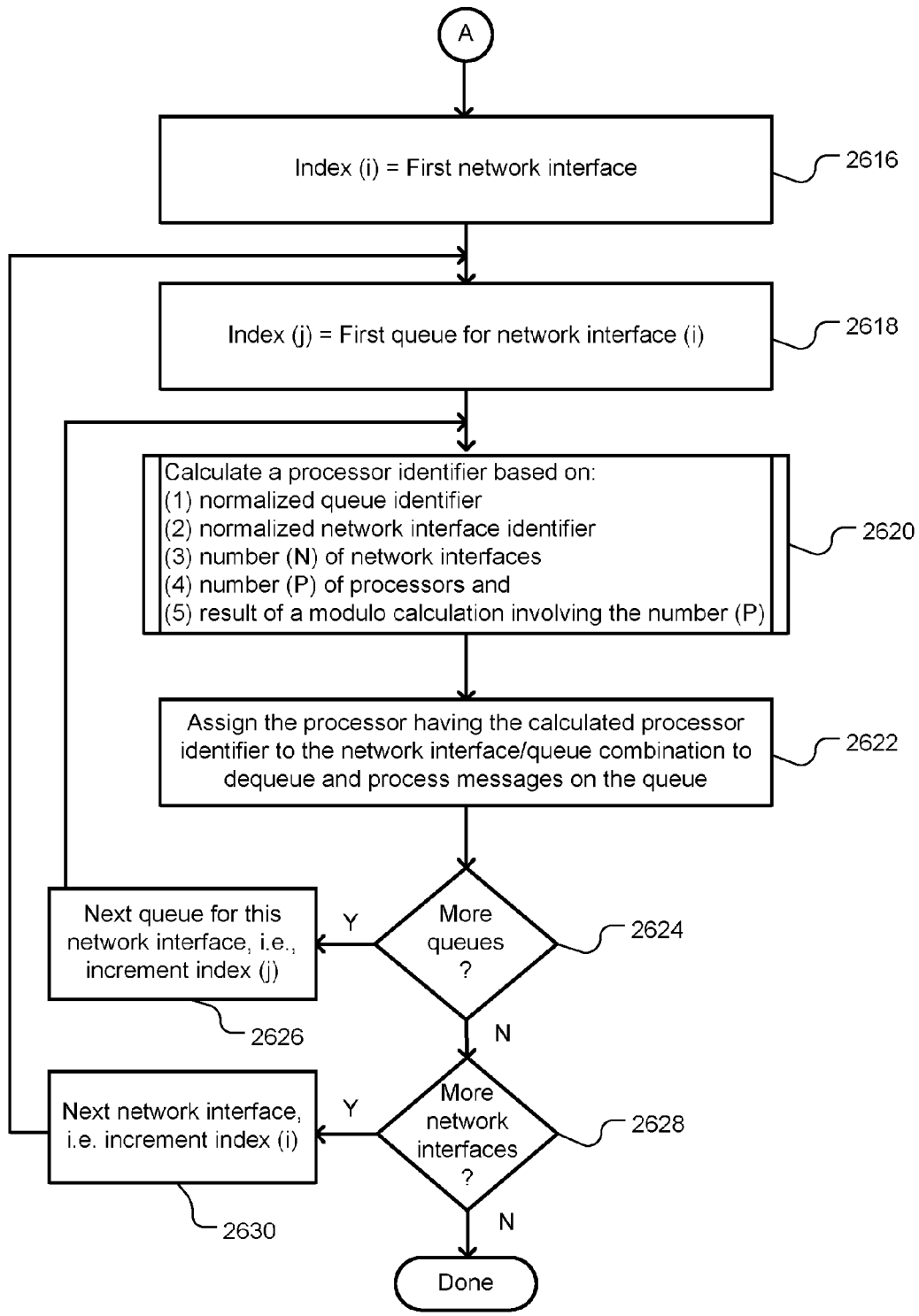

Regardless of the implementation of the resource allocator 2500, the resource allocator performs functions shown in a flowchart schematically illustrated in FIG. 26. At 2600, the resource accountant 2502 automatically ascertains the number of processors 2406-2410 (FIG. 24) available for handling the receive queues. As used herein, a "processor" is an independent processing unit, sometimes commonly referred to as a "core," that reads and executes program instructions. A single processor may be housed in a single integrated circuit (IC) die or chip package. However, manufacturers typically integrate multiple cores onto a single integrated circuit die, known as a chip multiprocessor or CMP, exemplified by the well-known 18-core Intel Xeon E5 2699v3 multiprocessor IC, or onto multiple dies in a single chip package.

The resource accountant 2502 may query one or more operating systems 2426 (FIG. 24), the hypervisor 2418, the router controller module 2428, a configuration file (not shown), hardware registers (not shown) or any other suitable source or sources of information to automatically ascertain the number of processors available for handling the queues 2436. It should be noted that not all processors 2406-2410 in a hardware configuration 2402 may be available for handling the queues 2436. For example, some processors 2406-2410 may be assigned or reserved to execute the router controller module 2428 (FIG. 24) and/or other for other purposes.

A system administrator may specify a number of processors 2406-2410, or a fraction of the processors 2406-2410 of a hardware configuration 2402, that are available for handling the queues 2436, such as via a control parameter or a configuration file. Nevertheless, the resource accountant 2502 reading such a parameter or configuration file ascertaining this number is included in the meaning of automatically ascertaining the number of processors available to handle the queues.

At 2602 the resource accountant 2502 (FIG. 25) automatically assigns a unique normalized processor identifier to each available processor 2406-2410. A "normalized identifier" here means an integer equal to or greater than zero. Normalized identifiers are assigned to items such that identifier zero is assigned to an item and the identifiers are assigned without any gaps in numbering. Therefore, the largest assigned identifier equals the number of items minus one. Normalized identifiers need not be assigned in numerical order. However, after assignment of normalized identifiers to k items, each item must have a unique normalized identifier between zero and (k−1) assigned to the item, and all the normalized identifiers between zero and (k−1) must be assigned.

Table 2 provides an exemplary hypothetical assignment of normalized processor identifiers to available processors of a hypothetical exemplary hardware configuration.

TABLE 2

Exemplary Hypothetical Normalized Queue Assignments

| Processor | Normalized Identifier |
|---|---|
| Processor 1 | 0 |
| Processor 2 | 1 |
| Processor 3 | 2 |
| Processor 7 | 3 |
| Processor 6 | 4 |
| Processor 9 | 5 |

As used herein, "P" represents the number of available processor 2406-2410, as ascertained by the resource accountant 2502. It should be noted that P is 1-based, i.e., P is a positive, non-zero integer. Thus, in the example of Table 1, P=6.

At 2604, the resource accountant 2502 automatically ascertains the number of network interfaces 2412-2416. The resource accountant 2502 may query one or more operating systems 2426 (FIG. 24), the hypervisor 2418, the router controller module 2428, a configuration file (not shown), hardware registers (not shown) or any other suitable source or sources of information to automatically ascertain the number of network interfaces.

Momentarily referring back to FIG. 24, in addition to the network interfaces 2412-2416 in the hardware components 2402, one or more of the router line card modules 2430-2434 may implement one or more virtual network interfaces (not shown) to support network connectivity with other software components executed by the same hardware that executes the router 2400. In these cases, additional virtual machines and operating systems may be hosted by the same hardware that hosts the router 2400. The additional virtual machines and operating systems may host virtual network switch software 2438 and, optionally, one or more servers, exemplified by a web server 2440 and a file server 2442. Optionally or alternatively, the servers 2440-2442 may provide network related services, such as name resolution, to the router controller 2428 and/or to the router line card modules 2430-2434.

In the context of the additional servers 2438-2442, the virtual switch 2438 provides network connectivity among the servers 2438-2442 in a well-known manner. The servers 2438-2442 may collectively form a local area network 2444, and the virtual switch 2438 may provide network connectivity between the local area network 2444 and a virtual network interface provided by one of the router line card modules 2430-2434 in a well-known manner.

As used herein, "N" represents the number of network interfaces, as ascertained by the resource accountant 2502 (FIG. 25), including any virtual network interfaces. It should be noted that N is 1-based, i.e., N is a positive, non-zero integer. At 2606 the resource accountant 2502 automatically assigns a unique normalized network interface identifier to each network interface.

At 2608, the queue manager 2504 associates each of the N network interfaces with at least one queue for receiving packets ("receive queue"). The queue manager 2504 may also associate each network interface with at least one queue for transmitting packets ("transmit queue"). The number of receive queues may be informed by the number (P) of available processors. For example, the queue manager 2504 does not associate any network interface with more than P receive queues. The number of receive queues for a given network interface may be limited by characteristics, such as hardware capabilities, of the network interface. Thus, all the network interfaces may have different respective numbers of receive queues. For simplicity of explanation, only network interfaces 2412-2416, and queues for these network interfaces, are discussed.

At 2610, for each network interface 2412-2416, the queue manager 2504 (FIG. 25) automatically assigns a unique normalized queue identifier to each queue 2436 of the network interface 2412-2416. Thus, each network interface 2412-2416 has an associated one or more queues having normalized queue identifiers 0, 1, 2, etc.

As noted, normalized identifiers are assigned to processors, network interfaces and queues (collectively "resources"). These normalized identifiers are used in calculations to assign processors to queues, as described herein. However, when an action is taken, relative to an identified resource, the actual (not normalized) identifier of the resource may be used. For example, when a packet is enqueued or dequeued from a queue, the actual, not normalized, identifier for the queue is used, such as in a call to an enqueue or dequeue routine.

At 2612, the queue manager 2504 (FIG. 25) stores data in a memory, such as the memory 2404 (FIG. 24), to represent the queues, such as indicated at 2436 (FIG. 24). Alternatively, the queue manager 2504 may store the data in the memory to represent the queues earlier, such as prior to operation 2608 or 2610, and adjust the data as needed to represent a correct number of the queues.

At 2614, the queue manager 2504 (FIG. 25) configures each network interface 2412-2416, and/or device drivers that control these network interfaces 2412-2416, to enqueue packets received by the network interfaces 2412-2416 onto the receive queues. The queue manager 2504 may also configure the network interfaces 2412-2416, and/or the device drivers, to dequeue packets from the transmit queues for transmission. As used herein, the term network interface includes a device driver that enqueues and/or dequeues packets to and from the receive queues and/or the transmit queues.

Figure 27:
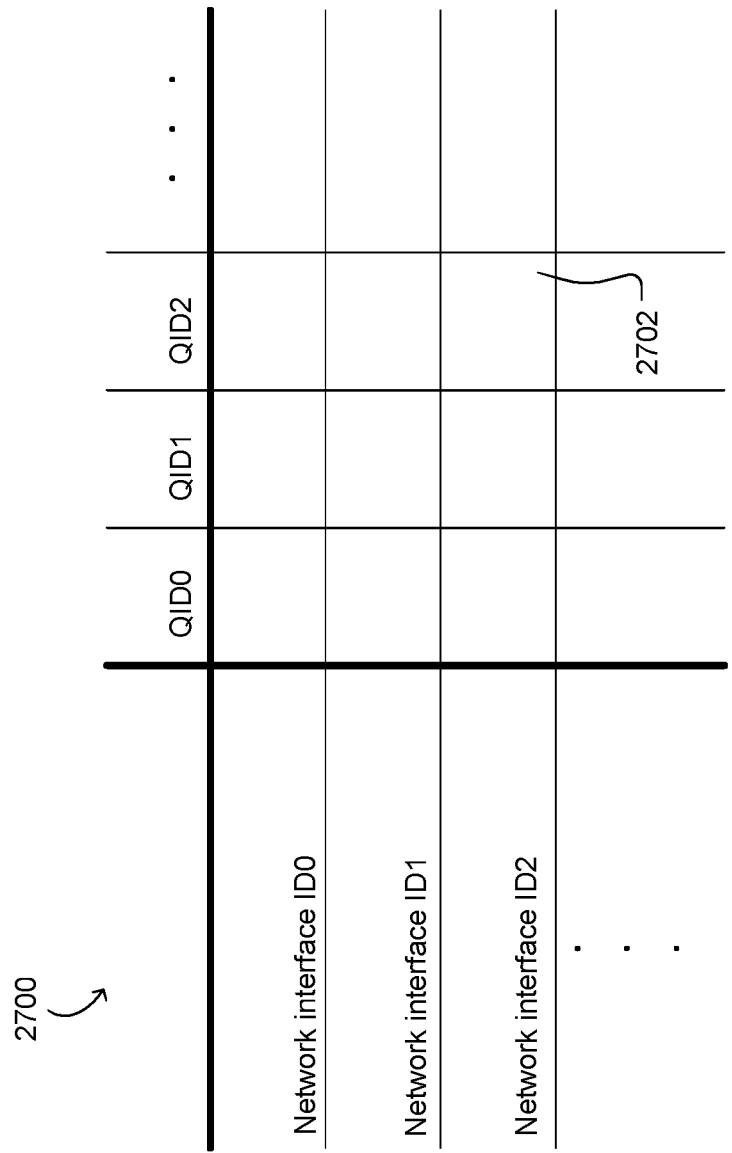
FIG. 27 is a schematic illustration of a two-dimensional table that is at least conceptually defined and filled the resource allocator of FIG. 25, while performing the operations of FIG. 26, according to an embodiment of the present invention.

The normalized network interface identifiers and the normalized queue identifiers at least conceptually define a two-dimensional array 2700, as schematically illustrated in FIG. 27. The normalized network interface identifiers extend down a side of the array 2700, thereby defining one horizontal row for each network identifier 2423-2416. The normalized queue identifiers extend across a top of the array 2700, thereby defining one vertical column for each queue 2436. The rows and columns intersect in respective cells, exemplified by cell 2702. Each cell 2702 represents a respective combination of: (a) a specific network interface 2412-2416 and (b) a specific queue onto which the specific network interface or its device driver enqueues packets received by the specific network interface, i.e., one of the queues 2436.

As noted, all the network interfaces 2412-2416 need not necessarily have identical numbers of queues. Therefore, the table 2700 need not necessarily be fully populated with cells 2702. Some of the rows may have fewer cells than other of the rows. However, due to the normalized nature of the queue identifiers, each normalized network interface identifier's row begins at normalized queue identifier zero (QID0) and extends contiguously to the largest numbered normalized queue identifier (QID) for the corresponding network interface.

The processor assignment calculator 2506 (FIG. 25) at least conceptually fills in each cell of the table 2700 with a normalized processor identifier, specifically the normalized processor identifier of one of the processor 2406-2410 that is assigned to handle packets received by the network interface represented by the row, and enqueued onto the queue represented by the column, of the cell.

The processor assignment calculator 2506 calculates a value for each cell a function of several parameters. The parameters include: (a) the cell's coordinates, i.e., the normalized queue identifier and the normalized network interface identifier of the cell, (b) the number (P) of available processors, (c) the number (N) of network interfaces and (d) a result of a modulo calculation involving the number P. The order in which the cell values are calculated is irrelevant. Thus, the table 2700 cell values may be calculated row-by-row, column-by-column, in another order or randomly.

Returning to the flowchart of FIG. 26, there is illustrated a process executed by the processor assignment calculator 2506 (FIG. 25), beginning at operation 2616, for at least conceptually filling in the cells of the table 2700. Whether or not an actual table 2700 is filled in, the values of the normalized processor identifiers calculated by the processor assignment calculator 2506 may be used to assign available ones of the processor 2406-2410 to handle the queues 2436. This assignment may include, for example, configuring the respective network interfaces 2412-2416 and/or their device drivers to use the respective processors 2406-2410, such as to interrupt or otherwise notify the respective processors when packets are enqueued to, or ready to be dequeued from, the corresponding queues 2436.

In the embodiment schematically illustrated by the flowchart of FIG. 26, the normalized processor identifiers are calculated by the processor assignment calculator 2506 per row of the table 2700. However, as noted, the order of calculating the normalized processor identifiers is irrelevant. To calculate a value for each cell of the table 2700, the processor assignment calculator 2506 executes a nested loop consisting of an outer loop and an inner loop. A "walk through" of calculating an exemplary set of processor assignments is provided below, with respect to FIG. 30.

At 2616, the processor assignment calculator 2506 initializes an index (i) to correspond to the first row of the table 2700, i.e., to the first normalized network interface, i.e., to normalized network interface zero, and then the processor assignment calculator 2506 begins executing the outer loop, one iteration of the outer loop for each row of the table 2700, i.e., one iteration of the outer loop for each network interface 2412-2416.

At 2618, the processor assignment calculator 2506 initializes another index (j) to correspond to the first column of the table 2700, i.e., to the first normalized queue, i.e., to normalized queue zero, and then the processor assignment calculator 2506 begins executing the inner loop, one iteration of the inner loop for each column of the table 2700, i.e., one iteration of the loop for each queue of the network interface of the row.

At 2620, the processor assignment calculator 2506 calculates a normalized processor identifier of the processor that is to handle the network interface/queue combination represented by the current cell. As noted, the processor assignment calculator 2506 calculates the normalized processor identifier based on: (a) the cell's coordinates, i.e., the normalized queue identifier and the normalized network interface identifier of the cell, (b) the number (P) of available processors, (c) the number (N) of network interfaces and (d) a result of a modulo calculation involving the number P. Details of this calculation will be discussed below, with respect to a flowchart in FIG. 28.

However, continuing for the moment with the flowchart of FIG. 26, at 2622, the processor assignment calculator 2506 assigns the processor 2406-2410 whose normalized processor identifier was calculated for the current cell to the combination of: (a) the network interface and/or driver (for simplicity, referred to herein as the "network interface") represented by the row of the current cell and (b) the queue represented by the column of the current cell. For simplicity, this combination is referred to as the "network interface/queue combination" of the cell.

At 2624, if more queues (columns) remain for the network interface of the current row, control passes to 2626, where the index (j) is incremented by one to represent the normalized queue identifier of the next queue for this network interface, and control returns to 2620. On the other hand, if at 2624 no more queues (columns) remain for the network interface of the current row, control passes to 2628.

At 2628, if more network interfaces (rows) remain in the table 2700, control passes to 2630, where the index (i) is incremented by one to represent the normalized network identifier of the next network interface, and control returns to 2618, where the inner loop begins again. On the other hand, if at 2628 no more network interfaces (rows) remain for the table 2700, the processor assignment calculator 2506 completes its operations.

Figure 28:
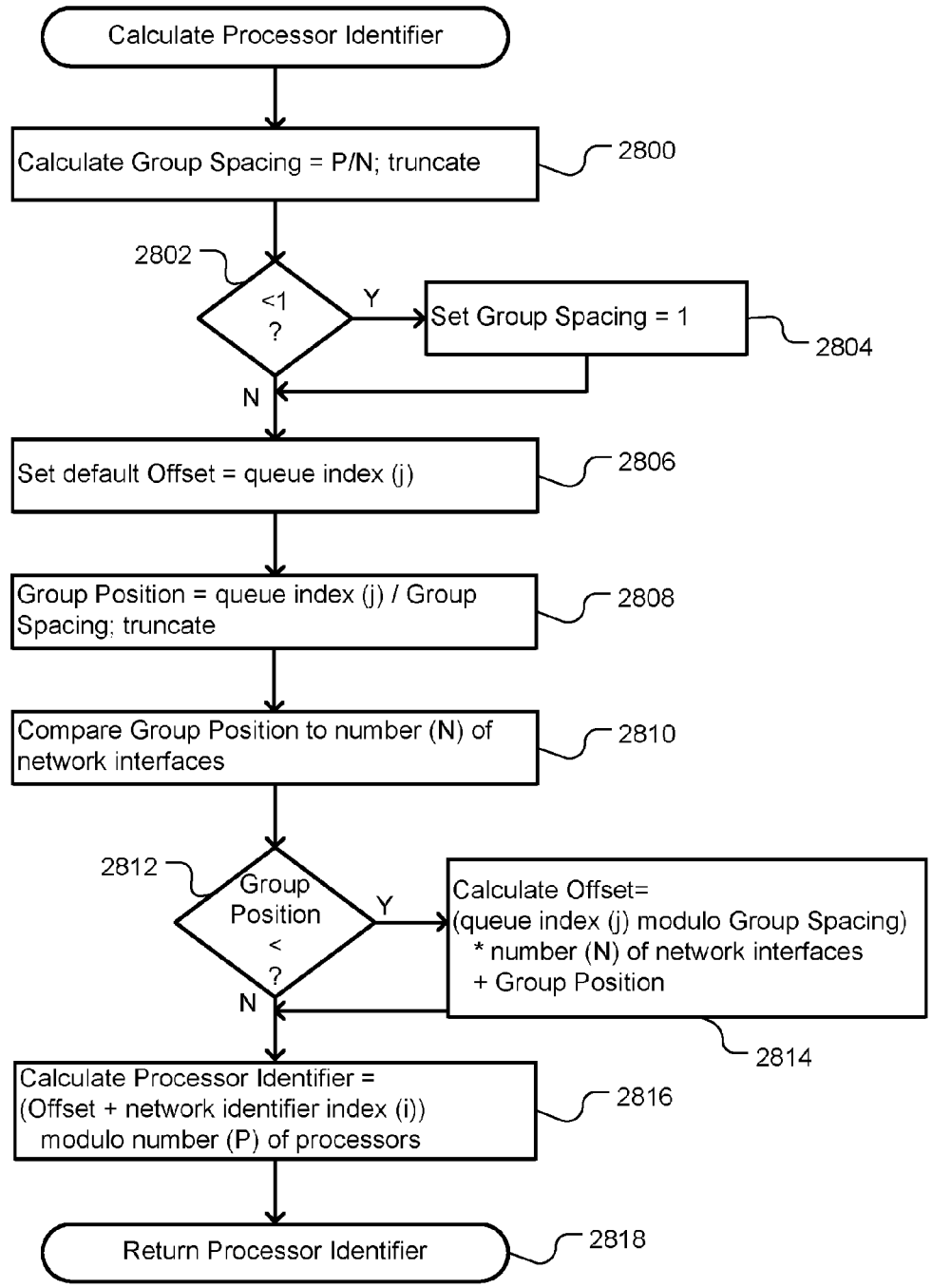
FIG. 28 is a flowchart schematically illustrating calculations performed by the resource allocator of FIG. 25 while calculating processor identifiers to fill in to the table of FIG. 27, according to an embodiment of the present invention.

As noted, at 2620, the processor assignment calculator 2506 calculates a normalized processor identifier for a given cell, and the flowchart of FIG. 28 schematically illustrates details of this calculation, according to an embodiment of the present invention. At 2800, the processor assignment calculator 2506 calculates a Group Spacing value as an integer division, according to equation (1):

$$\text{Group Spacing} = P/N \qquad (1)$$

Recall that P is the number of available processors 2406-2410, and N is the number of network interfaces 2412-2416. Thus, the Group Spacing essentially indicates the number of processors 2406-2410 that can be assigned to each network interface 2412-2416. Of course, the number of processors 2406-2410 may not be an integral multiple of the number of network interfaces 2412-2416, and processors can be assigned only as whole processors. Thus, the Group Spacing is the truncation of the average number of processors 2406-2410 that can be assigned to each network interface 2412-2416.

At 2802, if the quotient is less than 1, control passes to 2804, where the Group Spacing value is set to 1, otherwise control passes to 2806. At least one processor is to be assigned to each network interface.

At 2806, a default value of an Offset value is according to equation (1):

$$\text{Offset}=\text{index}(j) \quad (1)$$

That is, the Offset is set equal to the current cell's normalized queue identifier value, i.e., the current cell's column normalized column number. The Offset defines the first normalized processor identifier to assign to the network interface of the current row, as the processors are assigned across the row.

At 2808, the processor assignment calculator 2506 calculates a Group Position value as an integer division, according to equation (2):

$$\text{Group Position}=\text{index}(j)/\text{Group Spacing} \quad (2)$$

The Group Position value is truncated to an integer. Equation (2) ensures normalized processor identifiers are distributed across the queues of a given row.

At 2810, the Group Position value is compared to the number (N) of network interfaces 2412-2416. This condition essentially tests whether all available normalized processor identifiers have been assigned at least once down the current column. At 2812, if the Group Position value is less than N, control passes to 2814, otherwise control passes to 2816, in which case the default Offset, i.e., first processor for this column (queue).

At 2814, a new Offset value is calculated according to the equation:

$$\text{Offset}=(\text{index}(j) \text{ modulo Group Spacing})*N+\text{Group Position} \quad (3)$$

At 2816, a normalized processor identifier is calculated according to equation (4):

$$\text{Normalized Processor Identifier}=(\text{Offset}+\text{index}(i)) \text{ modulo } P \quad (4)$$

Equation (4) essentially distributes the processors in numerical normalized processor identification order, i.e., Offset+normalized network interface identifier; however, the normalized processor identifier numbers "roll over," hence the "modulo P," after the last normalized processor identifier has been assigned across a given row. At 2818, the calculated Normalized Processor Identifier is returned.

The normalized processor identifiers calculated by the processor assignment calculator 2506 may be used directly to assign processors 2406-2410 to handle the queues 2436 or, if necessary, a table, such as Table 2, may be used to convert or map the normalized processor identifiers of the assigned processor to hardware or other processor identifiers.

FIGS. 29 and 30 provide examples of normalized processor identifier assignments for some exemplary configurations of network interfaces and numbers of queues for each network interface. FIG. 29 shows assignments of four processors to four interfaces with four queues per network interface. FIG. 30 shows assignments of 17 processors to five network interfaces with 17 queues per network interface. As noted, if one or more of the network interfaces supports fewer than the maximum number of queues shown in the respective table, that network interface's row is merely truncated at the right to include only the number of supported queues.

With reference to the assignments of FIG. 30, looking left to right at the processor assignments in the first row (for network interface ID0), it can be seen that the assignments can be conceptually grouped into sets of monotonically ascending values, as indicated by dashed ellipses 3000, 3002, 3004, 3006, 3008 and 3010. The size of each group 3000-3010, with the possible exception of the last group 3010, is given by the Group Spacing value calculated by equation (1). In the example shown in FIG. 30, Group Spacing=P/N=17/5=3.

The position of each group within the row is given by the Group Position value calculated according to equation (2). For example, the Group Position for the first cell in the first group 3000 is Group Position=index(j)/Group Spacing=0/3=0. Similarly, the Group Position for the second cell in the first group 3000 is Group Position=index(j)/Group Spacing=1/3=0. Recall that the division is truncated to an integer. The Group Position for the third cell in the first group 3000 is Group Position=index(j)/Group Spacing=2/3=0. Thus, the Group Spacing value of all cells in the first group 3000 is zero.

The Group Position for the first cell in the second group 3002 is Group Position=index(j)/Group Spacing=3/3=1. Similarly, the Group Spacing values of the remaining cells in the second group 3002 is also 1. Likewise, it can be shown that the Group Spacing value for all the cells in the third group 3004 is 2, the Group Spacing value for all the cells in the fourth group 3006 is 3, the Group Spacing value for all the cells in the fifth group 3008 is 4 and the Group Spacing value for all the cells in the last group 3010 is 5.

The comparison at 2810 (FIG. 28) of Group Position to the number (N) of network interfaces 2412-2416 (FIG. 24) determines whether the last (right-most) group of a given row is being processed. The last group is processed specially, in that the last group may contain fewer cells than each of the other groups in the row. The last group is assigned any "leftover" processors that do not "fit" evenly into the other groups of the row.

Processing the cells of a row, left to right, the value (index(j) modulo Group Spacing) provides a zero-based index into the current group. For example, in the first row, (index(j) module Group Spacing) provides values of: 0, 1, 2, 0, 1, 2, 0, 1, 2 . . . . Multiplying this index by N provides values of: 0, 5, 10, 0, 5, 10, 0, 5, 10 . . . . Adding the Group Position to this product provides values of: 0, 5, 10, 1, 6, 11, 2, 7, 12, . . . , i.e., the values along the first row, apart from the special case last group 3010. These values are provided by Offset, which is calculated according to equation (3).

Normalized Processor Identifier, which is calculated according to equation (4), adds the row number, i.e., index (i), so each row begins with a processor identifier one greater than the previous row. This can be seen in FIG. 30 in the left-most column, as indicated at 3012. adds one to the processor identifier used to start each row. In calculating Normalized Processor Identifier, equation (4) uses the modulo function to "roll over" the processor identifier after all the processors have been assigned, i.e., equation (4) begins over at processor identifier zero.

The self-configuring router described herein may be stored on a suitable computer storage medium, such as a disk drive, as a complete operating system and application program image and executed by a virtual machine, as described with respect to FIG. 24, or natively on "bare metal" commercial off-the-shelf (COTS) hardware. Similarly, the self-configuring router may be implemented on dedicated-function hardware.

Embodiments of the present invention may be combined deployed in a stateful router, which is described herein.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" packets or the "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible. For example, illustrative embodiments permit an AIPR or similarly enabled router to use a lead session balancer to select an appropriate next hop router/AIPR.

The AIPRs through which the lead packet passes insert special metadata into the lead packet and optionally also into return packets as needed to allow each AIPR on the path to determine whether there is a prior node or AIPR on the path and whether there is a next hop node or AIPR on the path. To force session packets to traverse the same set of AIPRs, each successive AIPR typically changes the destination address field in each session packet to be the address of the next hop AIPR, and changes the source address field in each session packet to be its own network address. The last AIPR prior to the destination node then will change the source and destination address fields back to the original source and destination addresses used by the source node. In this way, session packets can be forwarded, hop by hop, from the source node through the set of AIPRs to the destination node, and vice versa.

Figure 7:
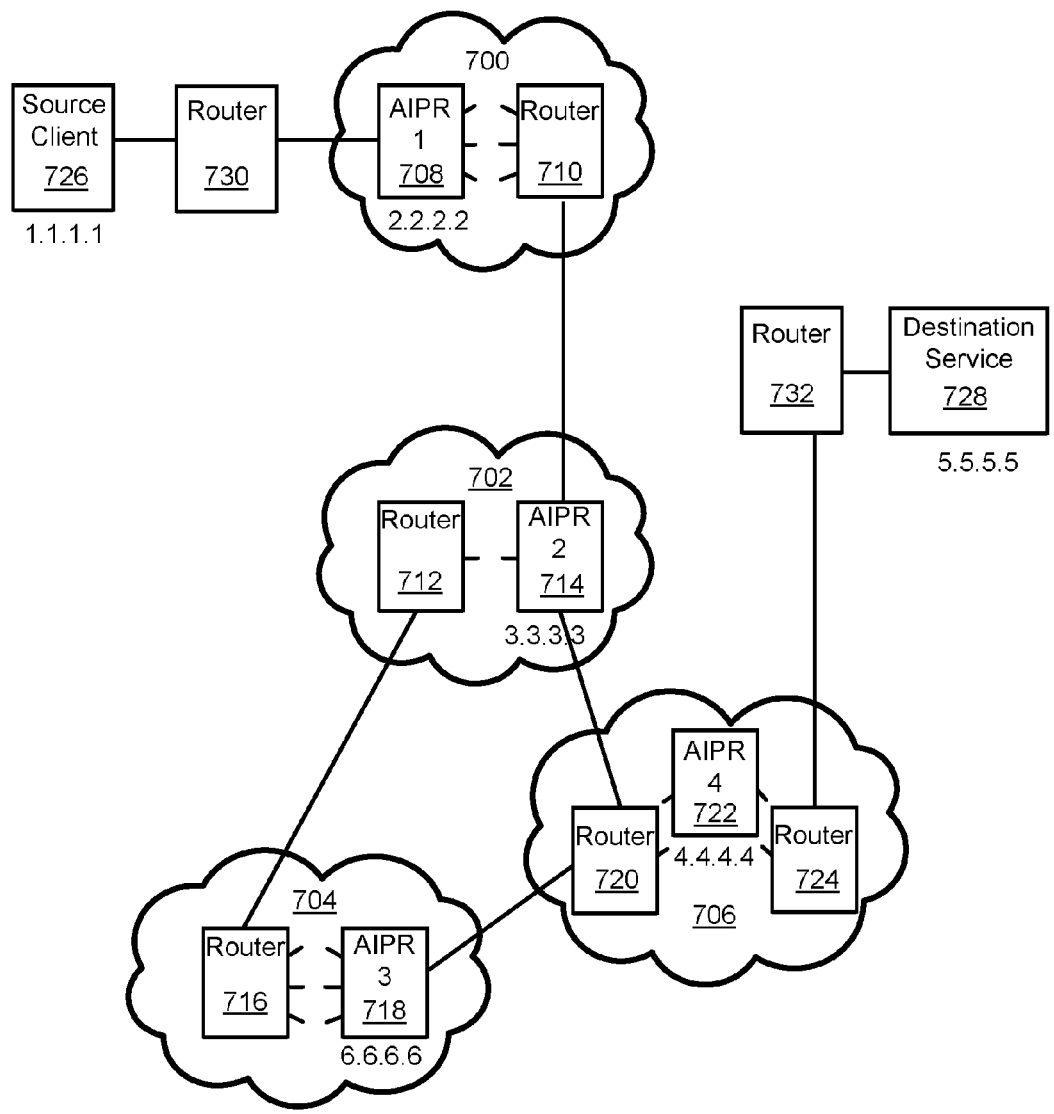
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
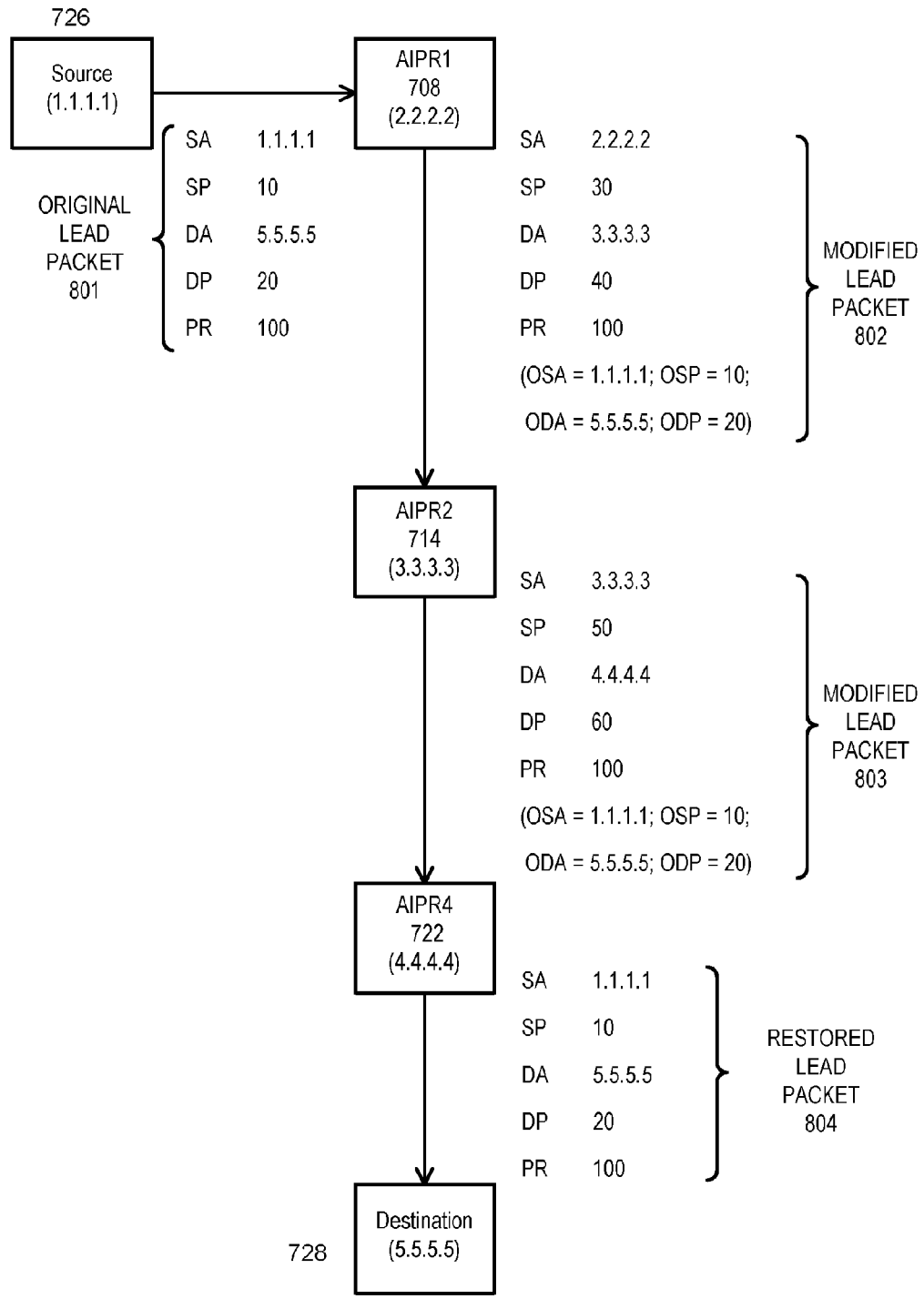
FIG. 8 schematically shows an example of lead packet processing from a source node to a destination node for stateful routing, in accordance with one exemplary embodiment.
Figure 12:
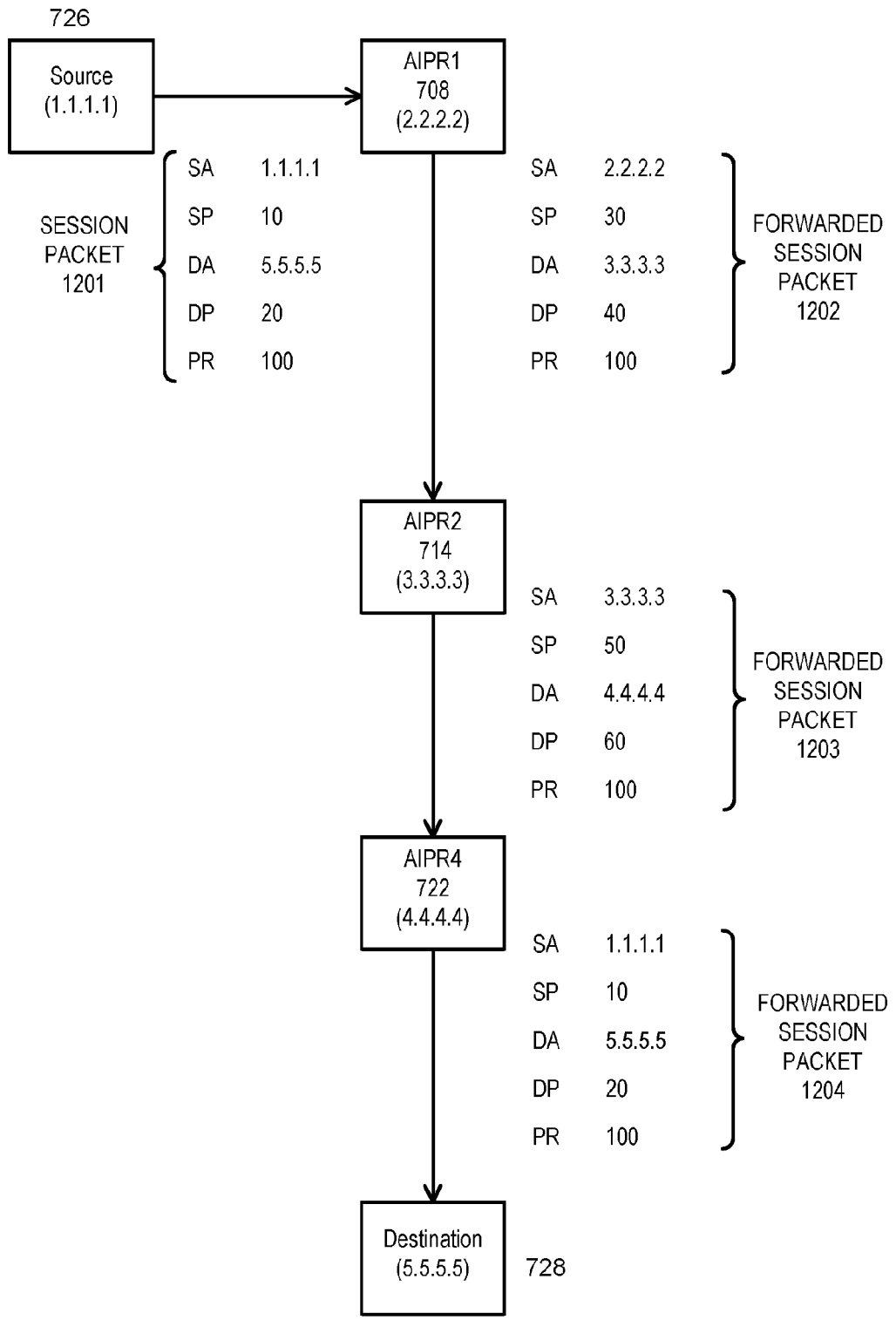
FIG. 12 is a schematic diagram providing an example of session packet processing for an example packet sent from the source device to the destination device through the AIPR devices for the session established in FIG. 8, in accordance with one exemplary embodiment.
Figure 13:
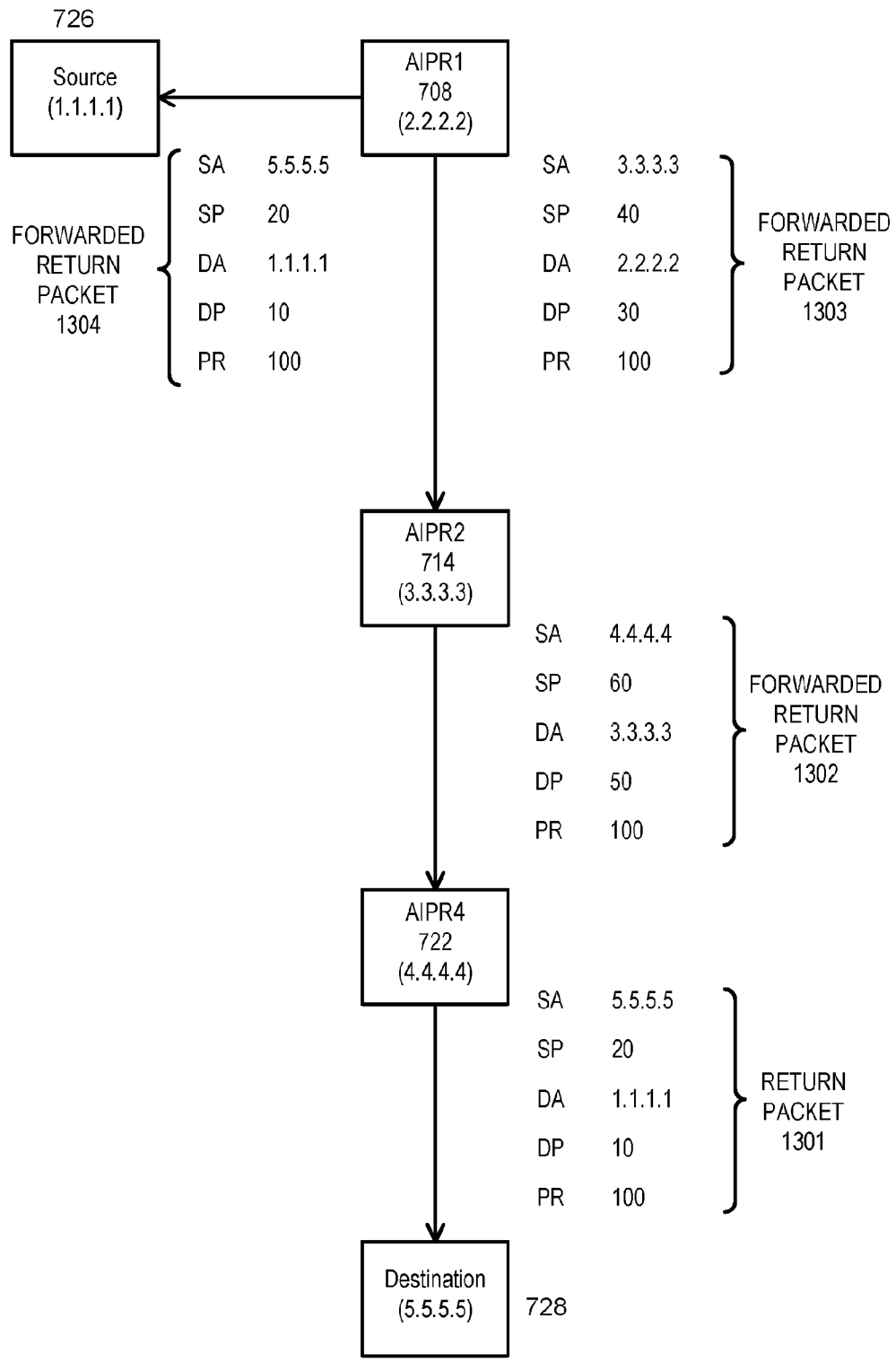
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing network interface for a particular destination network address, but also the next waypoint AIPR (if any) to use for that destination network address.

As noted above, in stateful routing, all forward packets associated with a particular session are made to follow the same path through a given set of AIPRs on their way from the source client node 726 to the destination service node 728. In a similar manner, all return packets associated with the session typically (but not necessarily, are made to traverse the same set of AIPRs in reverse order on their way from the destination service node 728 to the source client node 726.

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

Illustrative embodiments may identify the next AIPR in any of a variety of manners. For example, the AIPR may have a local session balancer that identifies a plurality of next nodes (i.e., potential next hop node), which may include all AIPRs, both AIPRs and routers, or in some cases just routers without AIPR functionality. The session balancer then may select the next hop node, whether it is an AIPR or a router without AIPR functionality (preferably leading to an AIPR though).

To force the lead packet to reach next waypoint AIPR 2 714 (as opposed to being naturally or randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing network interface. In certain exemplary embodiments, AIPR 1 708 may establish a flow that associates the session with the incoming network interface over which the lead packet 801 was received and the outgoing network interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path. AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing network interface.

To force the modified lead packet 803 to reach AIPR 4 722 (as opposed to being naturally or randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing network interface. In certain exemplary embodiments, AIPR 2 714 may establish a flow that associates the session with the incoming network interface over which the modified lead packet 802 was received and the outgoing network interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing network interface, AIPR 4 722 accesses its routing information base to look up routing information based on the original destination address of 5.5.5.5 (e.g., outgoing network interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing network interface. In certain exemplary embodiments, AIPR 4 722 may establish a flow that associates the session with the incoming network interface over which the lead packet 803 was received and the outgoing network interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11.

Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, and randomly).

Figure 14:
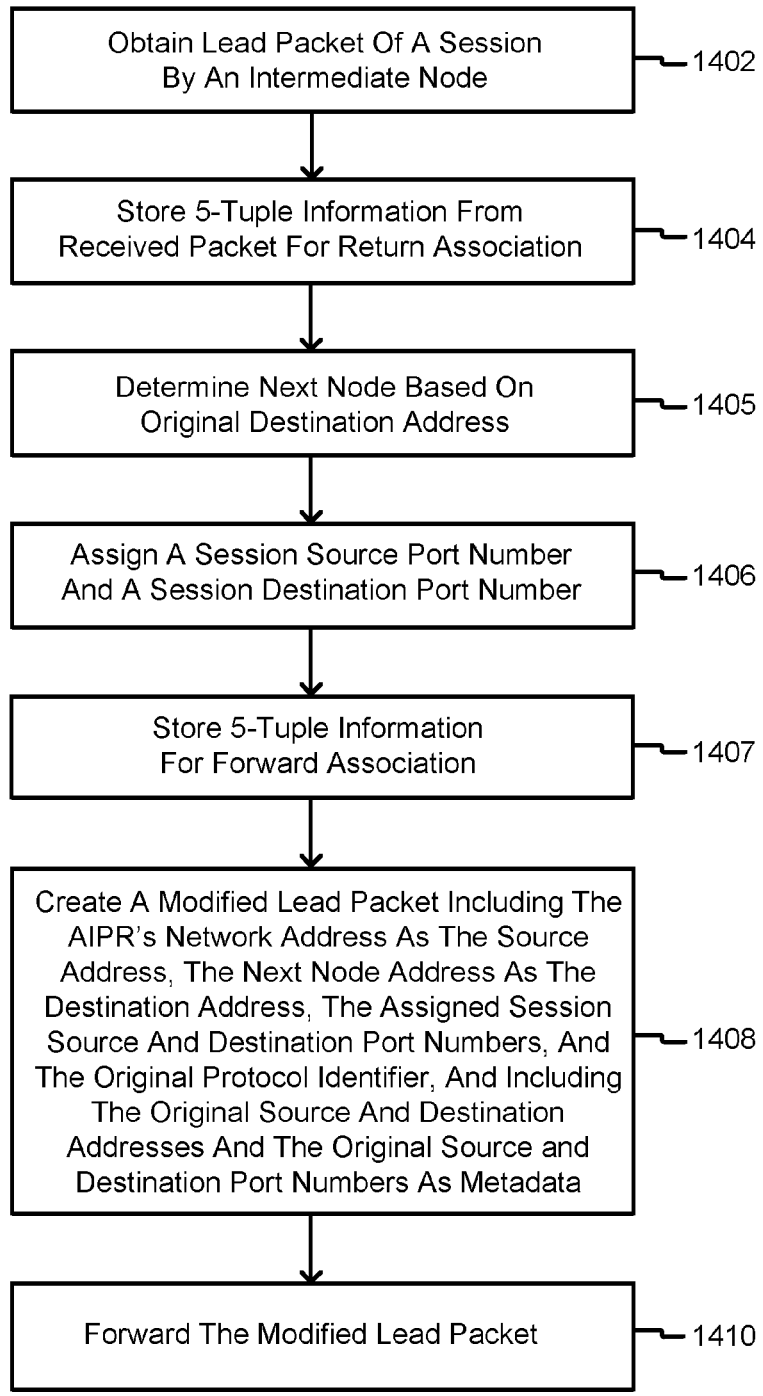
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next node/waypoint AIPR based on the original destination address. This typically involves accessing the AIPR's routing information base from which the AIPR can determine the outgoing network interface and next waypoint AIPR (if any) for the original destination address. As noted above, this may involve use of the session balancer.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
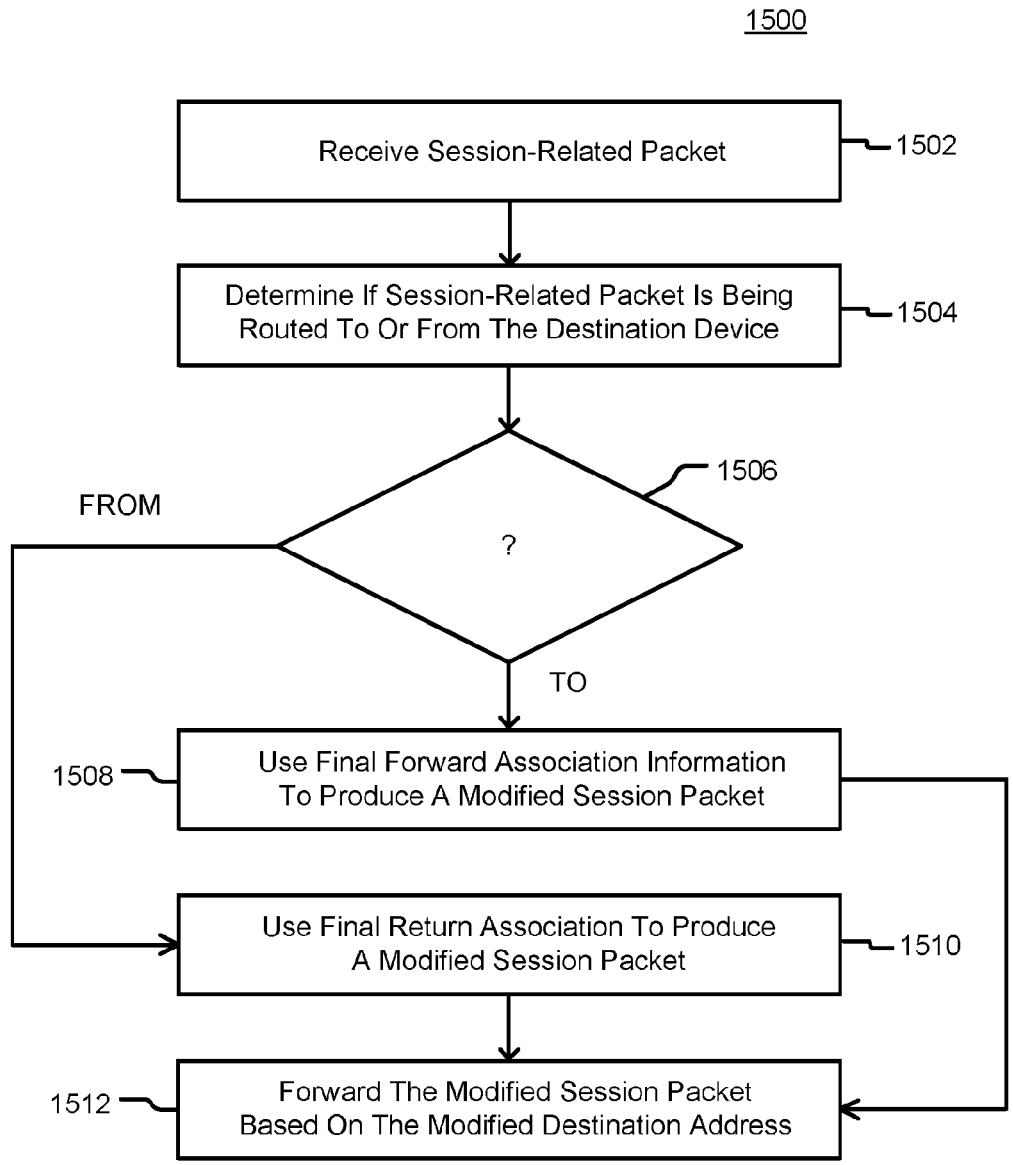
FIG. 15 is a flowchart schematically illustrating some session packet processing operations performed by an AIPR, in accordance with one exemplary embodiment.

FIG. 15 is a flowchart schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

SA 2.2.2.2
SP 10
DA 5.5.5.5
DP 20
PR 100
SSP 30 (session source port number assigned by AIPR 1 708)
SDP 40 (session destination port number assigned by AIPR 1 708)

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing network interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

SA 3.3.3.3
SP 10
DA 5.5.5.5
DP 20
PR 100
SSP 50 (session source port number assigned by AIPR 2 714)
SDP 60 (session destination port number assigned by AIPR 2 714)

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing network interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

SA 4.4.4.4
SP 10
DA 5.5.5.5
DP 20
PR 100
SSP 70 (session source port number assigned by AIPR 4 722)
SDP 80 (session destination port number assigned by AIPR 4 722)

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4;

a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 to establish an end-to-end communication session between the source client node 726 and the destination service node 728.

Lead Packet Identification in Stateful Session

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

TABLE 3

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
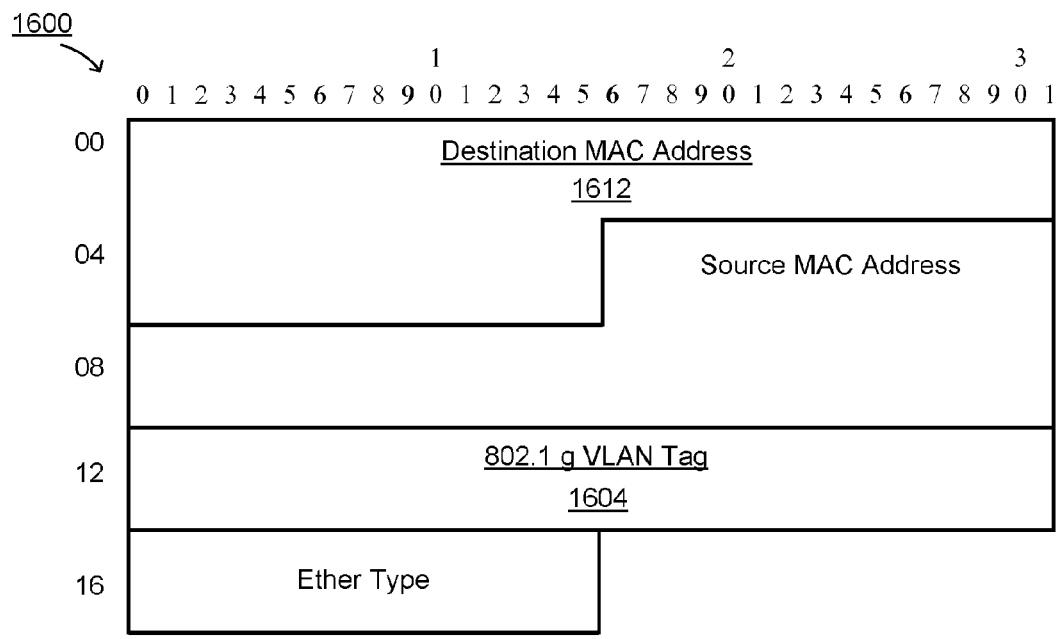
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
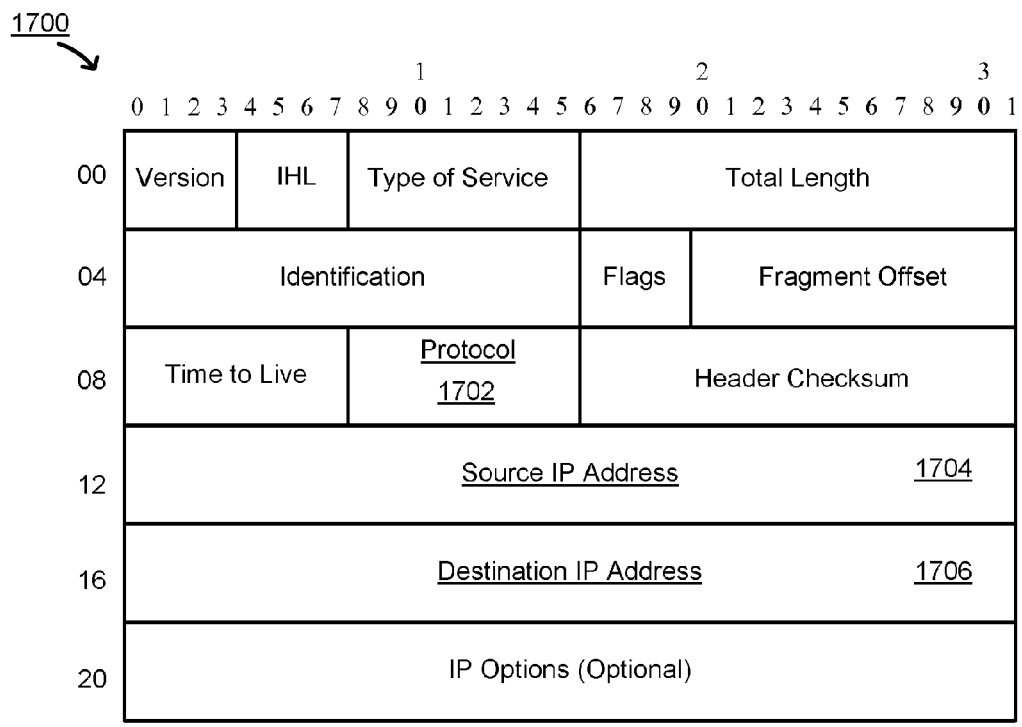
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
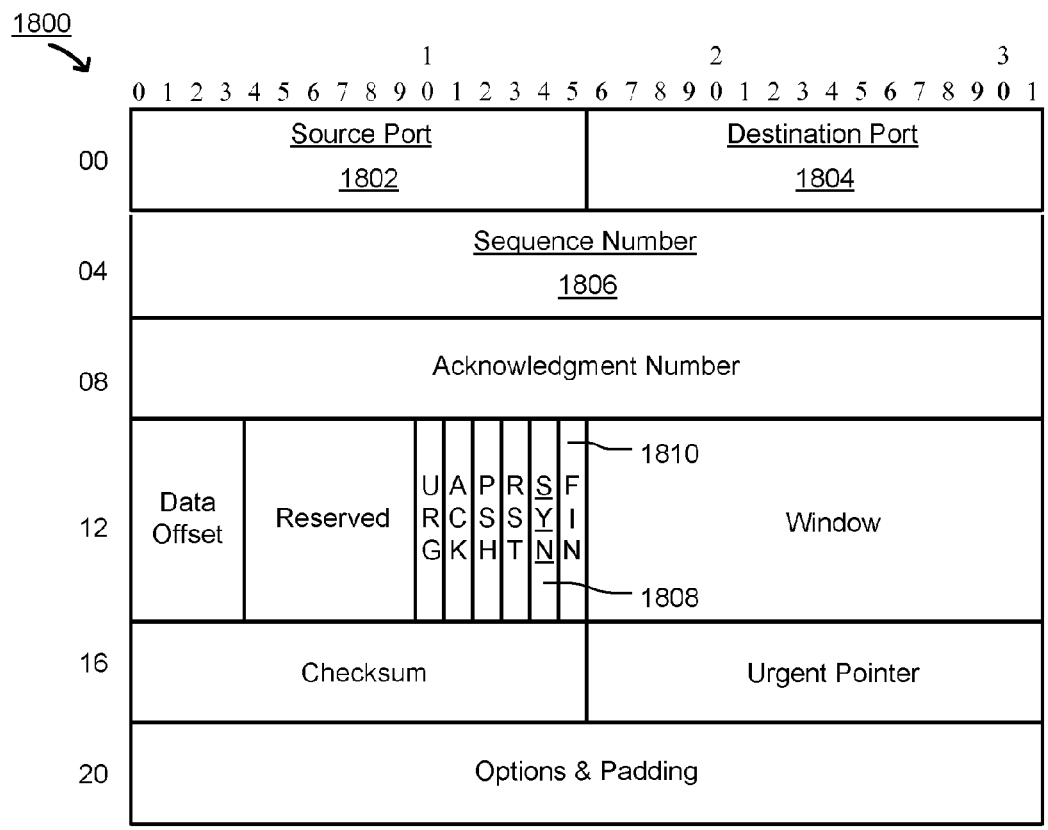
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

TABLE 4

| Data Item | Where From | Description |
| --- | --- | --- |
| Physical Interface | Ethernet Header | This is the actual network interface that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
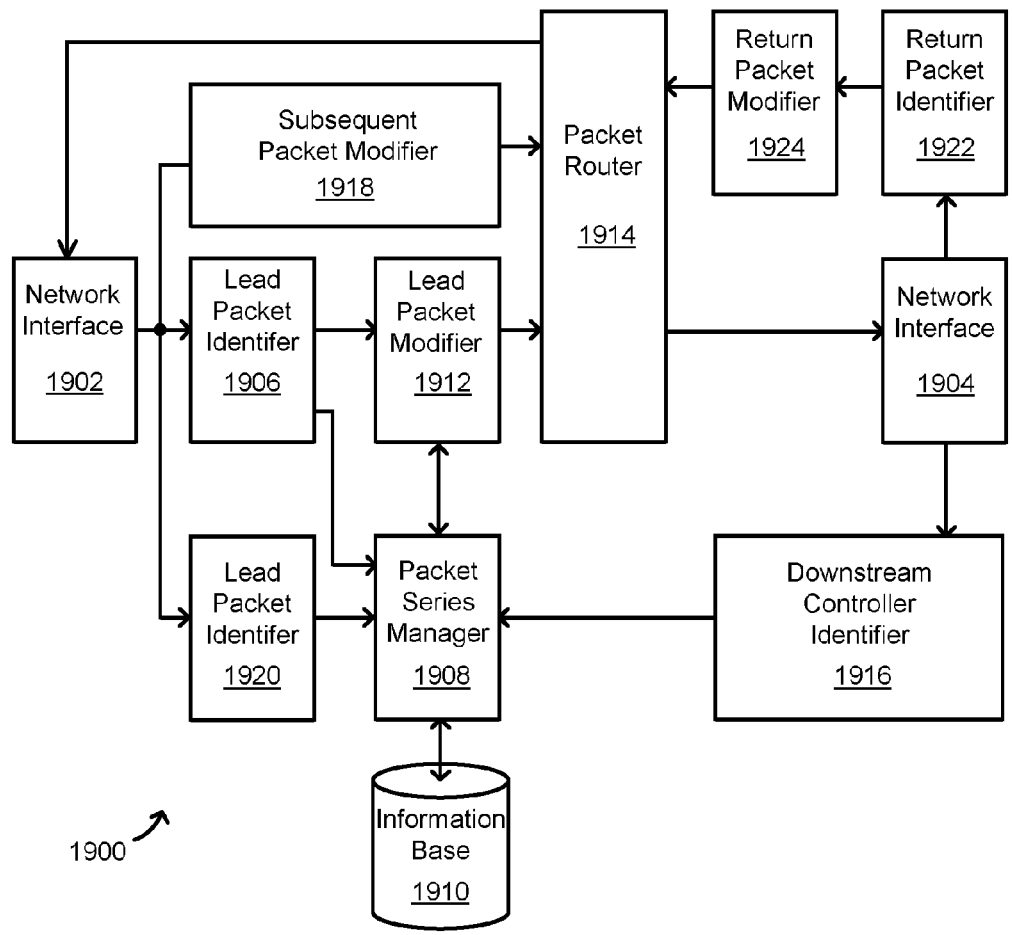
FIG. 19 schematically shows a block diagram of an AIPR of FIG. 7, in accordance with one exemplary embodiment.

FIG. 19 is a schematic block diagram of an exemplary AIPR (waypoint) 1900 configured in accordance with illustrative embodiments of the invention. The AIPR 1900 includes at least two network interfaces 1902 and 1904, through which the AIPR 1900 may be coupled to two networks. The network interfaces 1902 and 1904 may be, for example, Ethernet interfaces or virtual network interfaces. The AIPR 1900 may send and receive packets via the network interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the network interface 1902, in combination with a first port number assigned by the session manager 1908 for receiving subsequent packets of this session. The unique identifier may further include the network address of the AIPR 1900 or of the other network interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
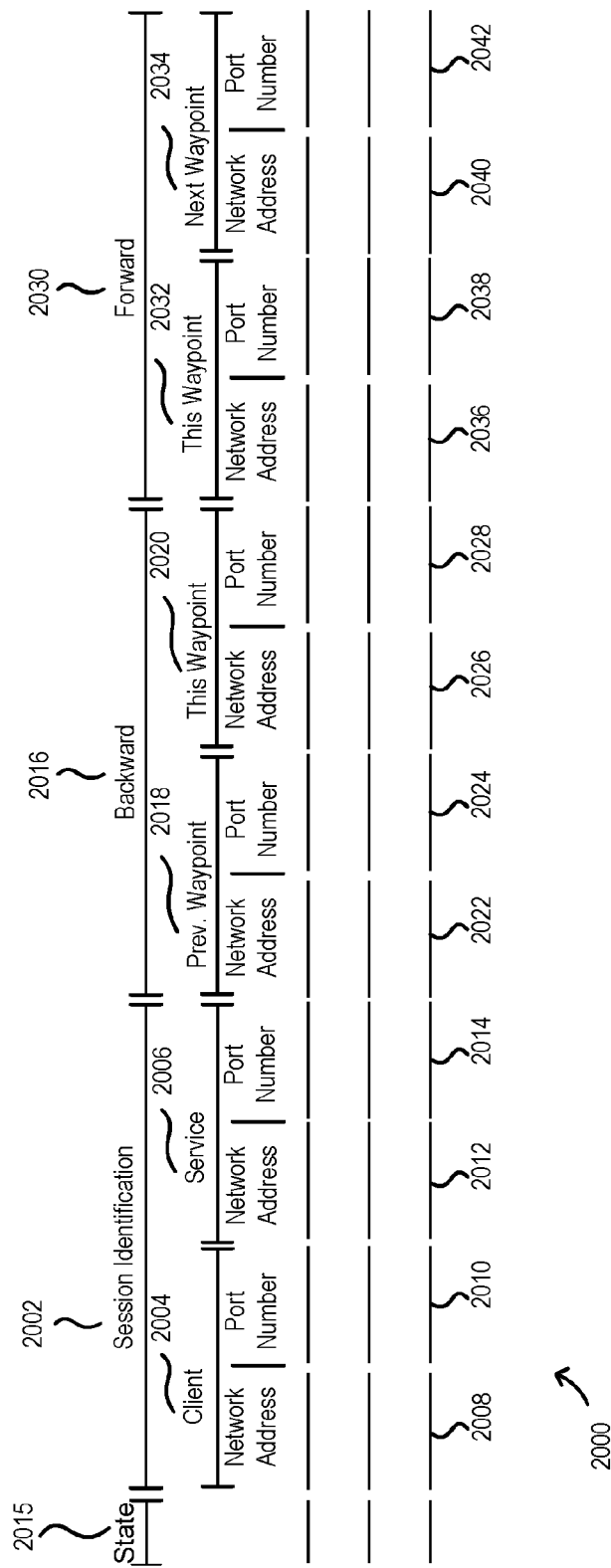
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the network interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the network interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below, or as when determined using the process of FIG. 5.

Some embodiments of the waypoint information base 2000 may include the forward information 2030 without the backward information 2016. Other embodiments of the waypoint information base 2000 may include the backward information 2016 without the forward information 2030.

Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
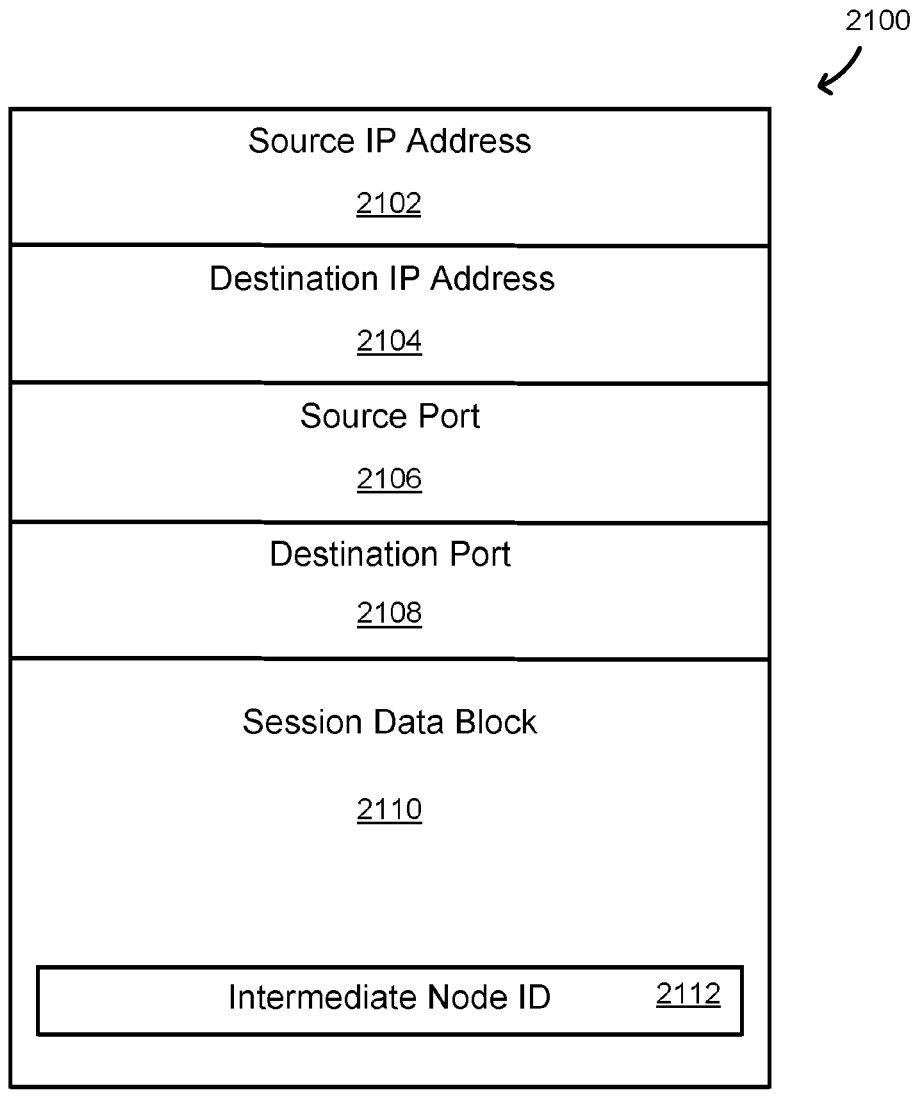
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second network interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000.

The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
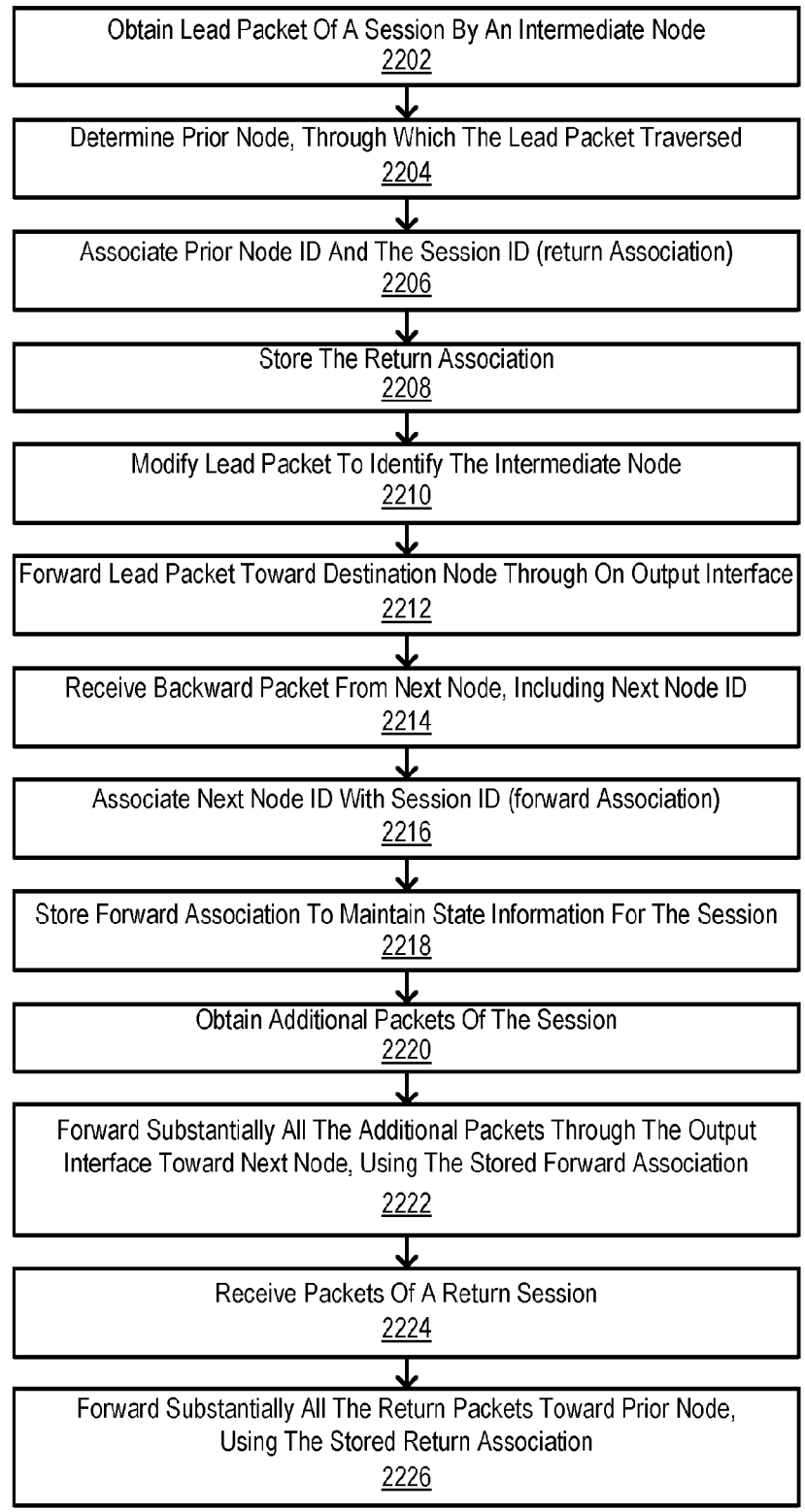
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output network interface to the IP network. The next hop node may be determined any number of ways The electronic output interface is in communication with the IP network. At 2214, a backward message (e.g., a packet, referred to as a "backward packet") is received through an electronic input network interface of the intermediate node.

The backward message is received from a next node having a next node identifier. The backward message includes the next node identifier and the session identifier. The electronic input network interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output network interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output network interface.

Figure 23:
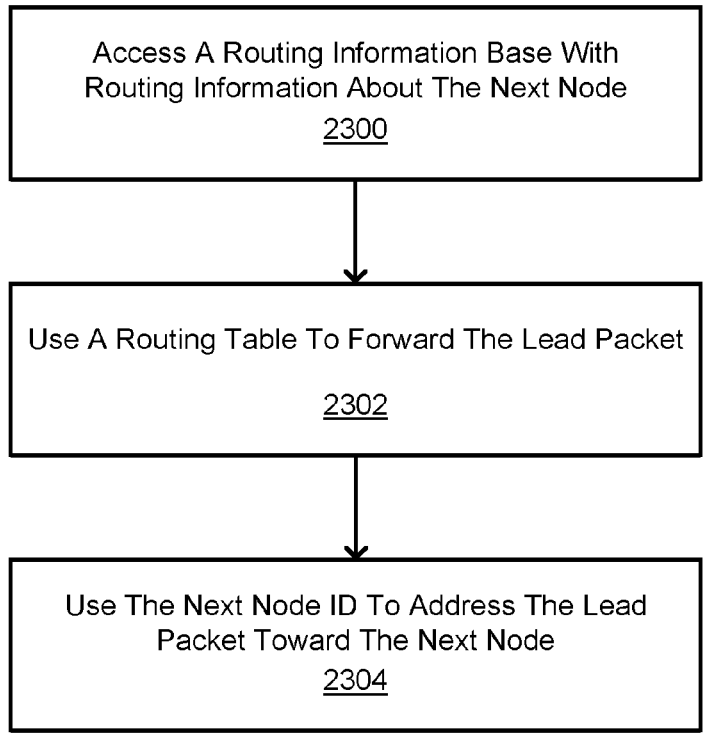
FIG. 23 is a flowchart illustrating some of the operations involved with forwarding a lead packet, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924, as well as the resource allocator 2500, may be implemented by a processor executing instructions stored in a memory, hardware (such as combinatorial logic, Application Specific Integrated Circuits (ASICs), Field-Programmable Gate Arrays (FPGAs) or other hardware, firmware or combinations thereof.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Furthermore, embodiments disclosed herein may be suitably practiced, absent any element that is not specifically disclosed herein. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Some embodiments may be implemented in a software-as-a-service ("SAAS") model or cloud computing model. Moreover, while embodiments may be described in connection with various illustrative data structures, systems may be embodied using a variety of data structures.

What is claimed is:

1. A self-configuring router, comprising:
a plurality of P processors, each processor of the plurality of P processor having a normalized processor identifier;
a memory coupled to the plurality of P processors;
a plurality of queues represented by data stored in the memory, each queue of the plurality of queues having a normalized queue identifier;
a plurality of N network interfaces, wherein each network interface of the plurality of N network interfaces: (a) has a normalized network interface identifier, (b) is associated with at least one queue of the plurality of queues and (c) is configured to automatically enqueue messages received thereby onto the at least one queue associated therewith; and
a resource allocator configured to automatically:
(a) calculate, for each network interface/queue combination of the plurality of N network interfaces and the plurality of queues, a processor identifier of a respective processor of the plurality of P processors based on:
(1) the normalized queue identifier of the queue of the network interface/queue combination, (2) the normalized network interface identifier of the network interface associated with the queue, (3) the number N of network interfaces in the plurality of N network interfaces, (4) the number P of processors in the plurality of P processors and (5) a result of a modulo calculation involving the number P; and
(b) assign the processor having the calculated processor identifier to the network interface/queue combination to dequeue and process messages on the queue of the interface/queue combination.

2. The self-configuring router of claim 1, wherein at least one network interface of the plurality of N network interfaces is associated with at least two queues of the plurality of queues.

3. The self-configuring router of claim 1, wherein the resource allocator comprises a processor.

4. The self-configuring router of claim 1, wherein:
each processor of the plurality of processors has a normalized processor identifier;
for each network interface/queue combination, the resource allocator:
calculates a group spacing as a quotient calculated by dividing the number P of processors by the number N of network interfaces and, if the quotient is less than 1, setting the group spacing to 1;

sets an offset to the normalized queue identifier of the queue of the network interface/queue combination;

calculates a group position as a quotient calculated by dividing the normalized queue identifier of the queue of the network interface/queue combination by the group spacing and truncating the quotient to an integer;

compares the group position to the number N of network interfaces;

if, as a result of the comparison, the group position is found to be less than the number N of network interfaces, sets the offset to a value according to the formula:

((the normalized queue identifier MODULO the group spacing)*the number $N$ of network interfaces)+the group position;

calculates a temporary value according to the formula:

(the offset+the normalized network interface identifier) MODULO the number $P$ of processors; and assigns the processor having a normalized processor identifier equal to the temporary value to the network interface/queue combination.

5. A method for automatically managing hardware resources within a router, the method comprising automatically:

storing data in a memory of the router, the data representing a plurality of queues;

assigning to each queue of the plurality of queues a respective normalized queue identifier;

ascertaining a number P of processors available in the router;

ascertaining a number N of network interfaces available in the router;

assigning to each network interface of the N network interfaces a respective normalized network interface identifier;

associating each network interface of the N network interfaces with at least one queue of the plurality of queues;

configuring each network interface of the N network interfaces to enqueue messages received thereby onto the queue(s) associated therewith;

for each network interface/queue combination of the N network interfaces and the plurality of queues:

calculating a processor identifier of a respective processor of the P processors, based on:
(a) the normalized queue identifier of the queue of the network interface/queue combination, (b) the normalized network interface identifier of the network interface associated with the queue, (c) the number N of network interfaces and (d) the number P of processors available in the router; and
a result of a modulo calculation involving the number P; and assigning the processor of the P processors having the calculated processor identifier to dequeue and process messages on the queue of the network interface/queue combination.

6. The method of claim 5, wherein associating each network interface of the N network interfaces with at least one queue of the plurality of queues comprises associating at least one network interface of the N network interfaces with at least two queues of the plurality of queues.

7. The method of claim 5, further comprising:

assigning to each processor of the P processors a respective normalized processor identifier; and wherein assigning the respective processor of the P processors to dequeue and process messages on the queue of the network interface/queue combination comprises:

for each network interface/queue combination:

calculating a group spacing as a quotient by dividing the number P of processors by the number N of network interfaces and, if the quotient is less than 1, setting the group spacing to 1;

setting an offset to the normalized queue identifier of the queue of the network interface/queue combination;

calculating a group position as a quotient by dividing the normalized queue identifier of the queue of the network interface/queue combination by the group spacing and truncating the quotient to an integer;

comparing the group position to the number N of network interfaces;

if, as a result of the comparing, the group position is found to be less than the number N of network interfaces, setting the offset to a value according to the formula:

((the normalized queue identifier MODULO the group spacing)*the number $N$ of network interfaces)+the group position;

calculating a temporary value according to the formula:

(the offset+the normalized network interface identifier) MODULO the number $P$ of processors; and assigning a processor having a normalized processor identifier equal to the temporary value to dequeue and process the messages on the queue of the network interface/queue combination.

8. A non-transitory computer-readable medium encoded with instructions that, when executed by a processor, establish processes for performing a computer-implemented method of managing hardware resources in a router, the processes comprising:

a process storing data in a memory of the router, the data representing a plurality of queues;

a process assigning to each queue of the plurality of queues a respective normalized queue identifier;

a process ascertaining a number P of processors available in the router;

a process ascertaining a number N of network interfaces available in the router;

a process assigning to each network interface of the N network interfaces a respective normalized network interface identifier;

a process associating each network interface of the N network interfaces with at least one queue of the plurality of queues;

a process configuring each network interface of the N network interfaces to enqueue messages received thereby onto the queue(s) associated therewith;

a process, for each network interface/queue combination of the N network interfaces and the plurality of queues:

calculating a processor identifier of a respective processor of the P processors, based on:
(a) the normalized queue identifier of the queue of the network interface/queue combination, (b) the normalized network interface identifier of the network interface associated with the queue, (c) the number N of network interfaces and (d) the number P of processors available in the router; and a result of a modulo calculation involving the number P; and assigning the processor of the P processors having the calculated processor identifier to dequeue and process messages on the queue of the network interface/queue combination.

* * * * *